United States Patent [19]

Mochizuki

[11] Patent Number: 4,792,851
[45] Date of Patent: Dec. 20, 1988

[54] METHOD AND APPARATUS FOR CODING MOTION IMAGE SIGNAL

[75] Inventor: Takashi Mochizuki, Tokyo, Japan

[73] Assignee: NEC Corporation, Japan

[21] Appl. No.: 99,091

[22] Filed: Sep. 21, 1987

[30] Foreign Application Priority Data

| Sep. 25, 1986 | [JP] | Japan | 61-227647 |
| Oct. 17, 1986 | [JP] | Japan | 61-246657 |
| Oct. 27, 1986 | [JP] | Japan | 61-256131 |
| Oct. 30, 1986 | [JP] | Japan | 61-256936 |
| Oct. 30, 1986 | [JP] | Japan | 61-256937 |

[51] Int. Cl.$^4$ .................. H04N 7/133; H04N 7/137
[52] U.S. Cl. .......................... 358/136; 358/133
[58] Field of Search .............. 358/133, 135, 136, 138, 358/140, 160

[56] References Cited

U.S. PATENT DOCUMENTS

| 4,704,628 | 11/1987 | Chen | 358/136 |
| 4,707,738 | 11/1987 | Ferre | 358/135 |

OTHER PUBLICATIONS

IEEE Transactions on Communications, vol. COM-33, pp. 1291-1302, Dec. 1985.
2nd International Technical Symposium on Optical and Electro Optical Applied Science and Engineering, SPLE Conf. B594, Image Coding, Dec. 1985.
IEEE Transaction on Communications, vol. COM-25, pp. 1329-1339, Nov. 1977.

Primary Examiner—Howard W. Britton
Attorney, Agent, or Firm—Laff, Whitesel, Conte & Saret

[57] ABSTRACT

An encoder in an encoder/decoder system includes a circuit for orthogonally transforming an input image signal, a circuit for receiving the input image signal, judging which orthogonal transformation coefficient is to be omitted and which orthogonal transformation coefficient is to be interframe-coded, and outputting a judgement result as mode information, and a circuit for receiving an output signal from the orthogonal transformation circuit, omitting the orthogonal transformation coefficient according the mode information, and outputting a coded image signal. In a decoder in the encoder/decoder system, the orthogonal transformation coefficient is omitted on the basis of the mode information sent from the encoder, thereby decoding the image signal.

18 Claims, 20 Drawing Sheets

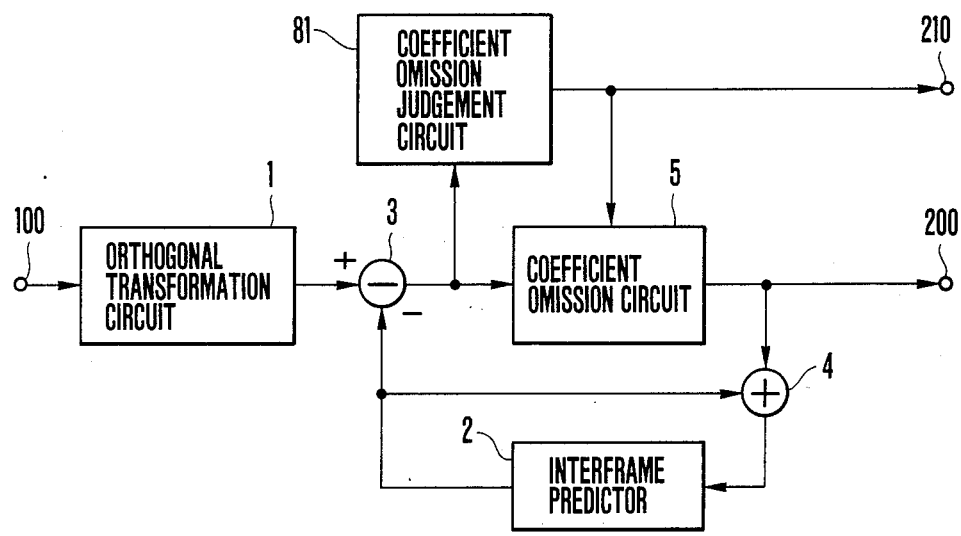
F I G. 3A
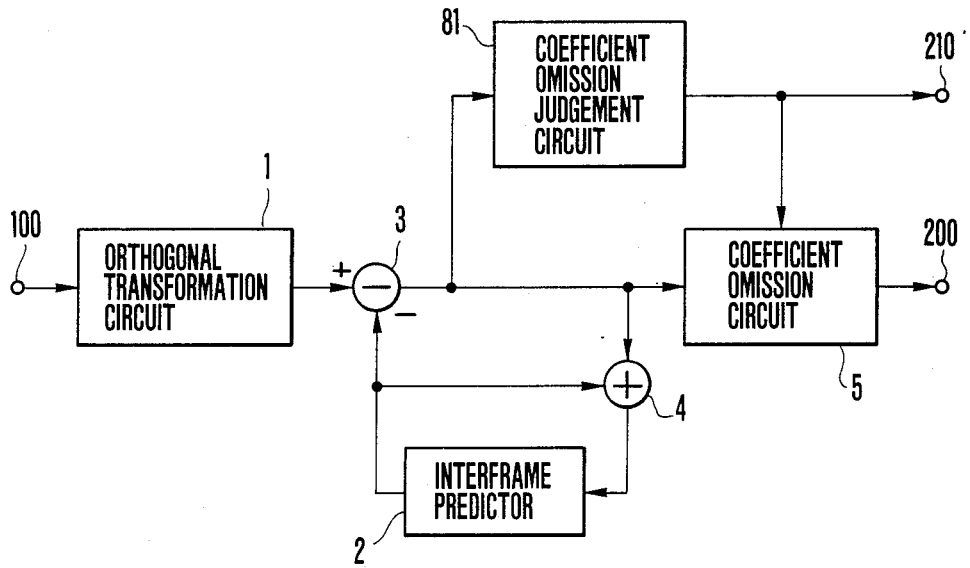
F I G. 3B

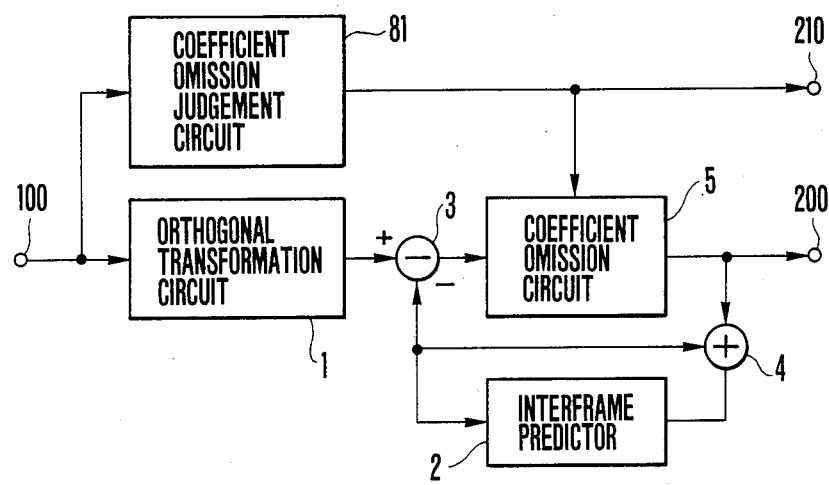
F I G. 5
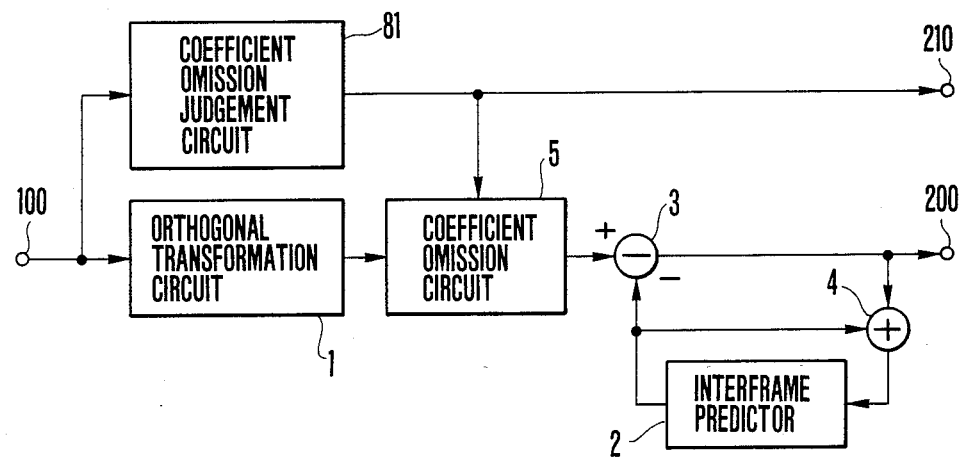
F I G. 6
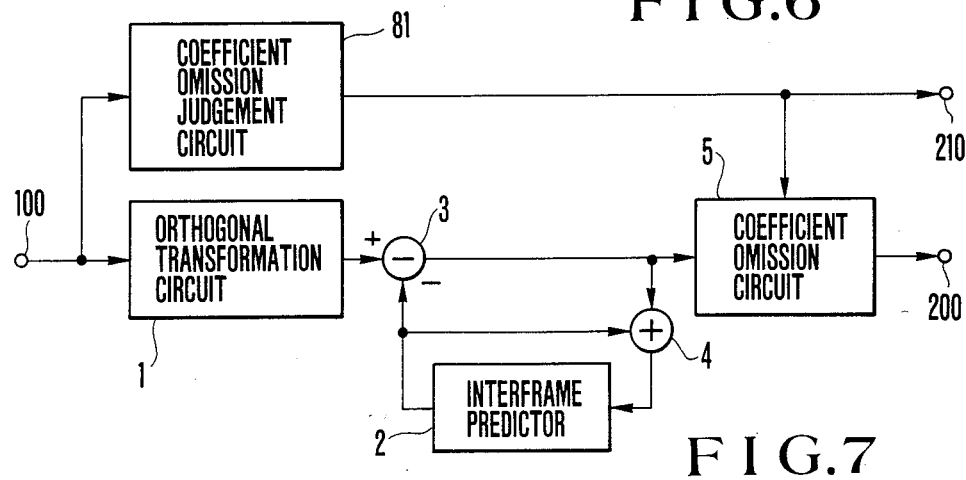
F I G. 7

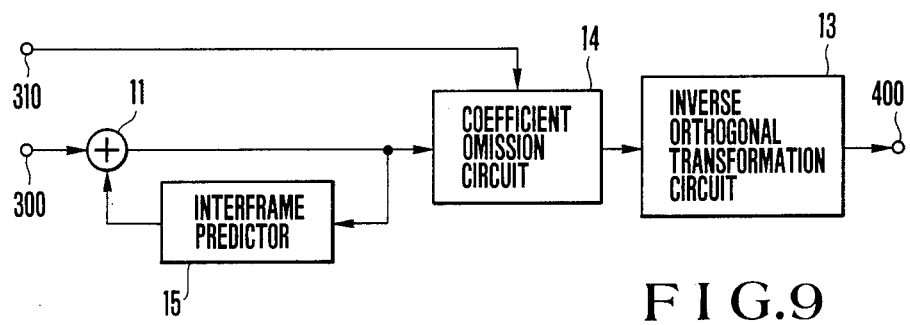
FIG.9
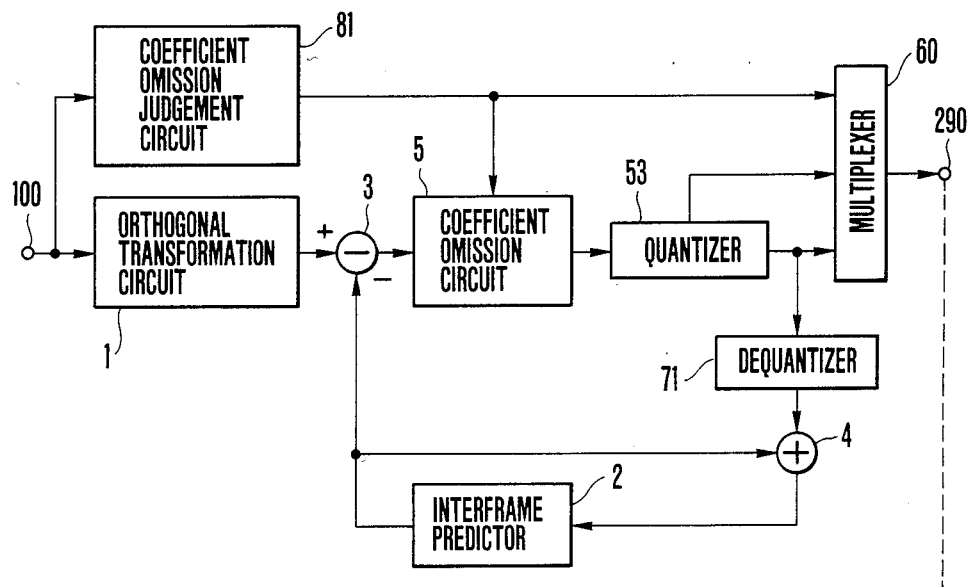
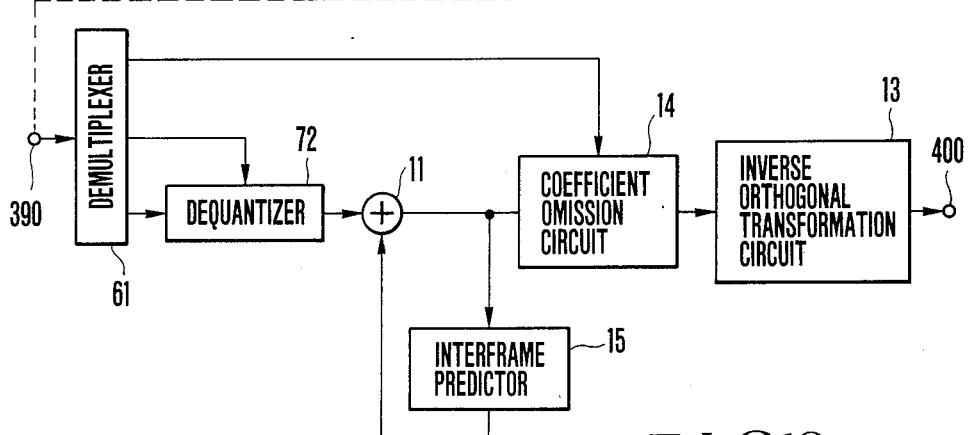
FIG.10

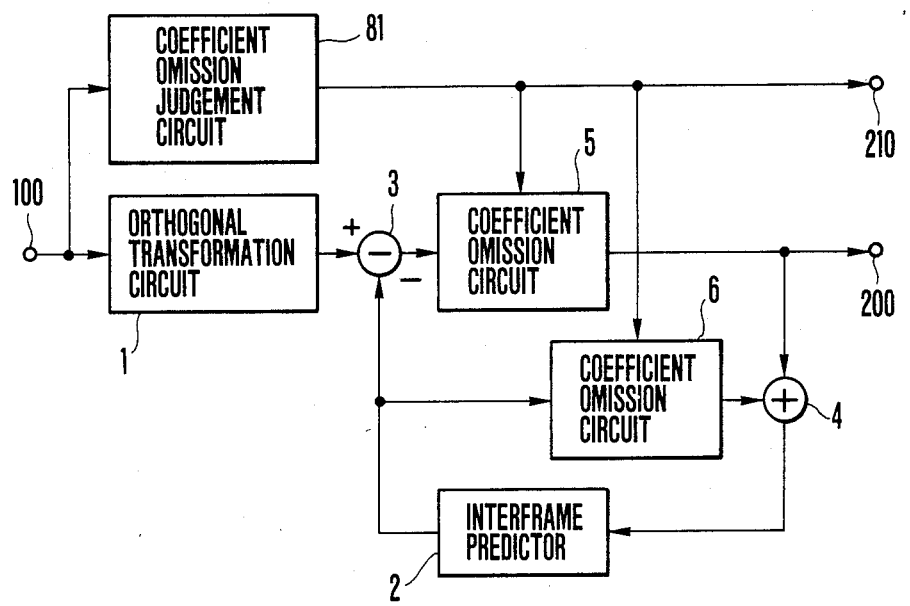
F I G.12 A
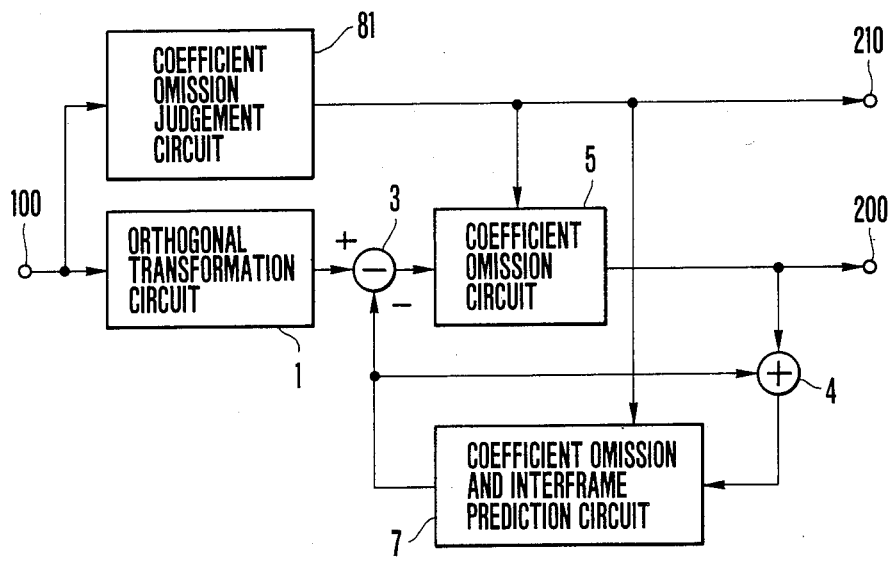
F I G.12 B

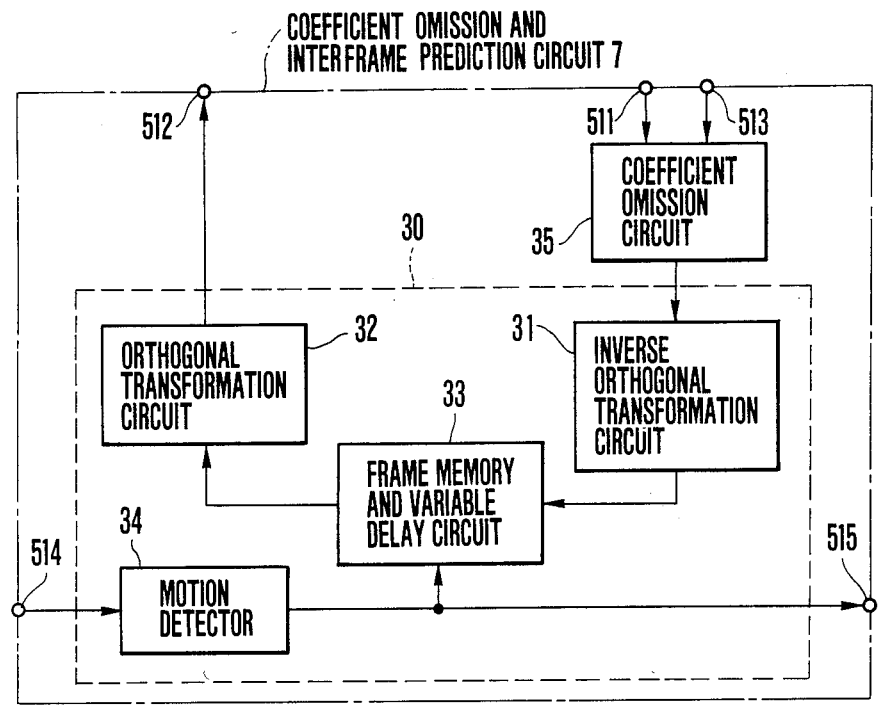
F I G. 15 A
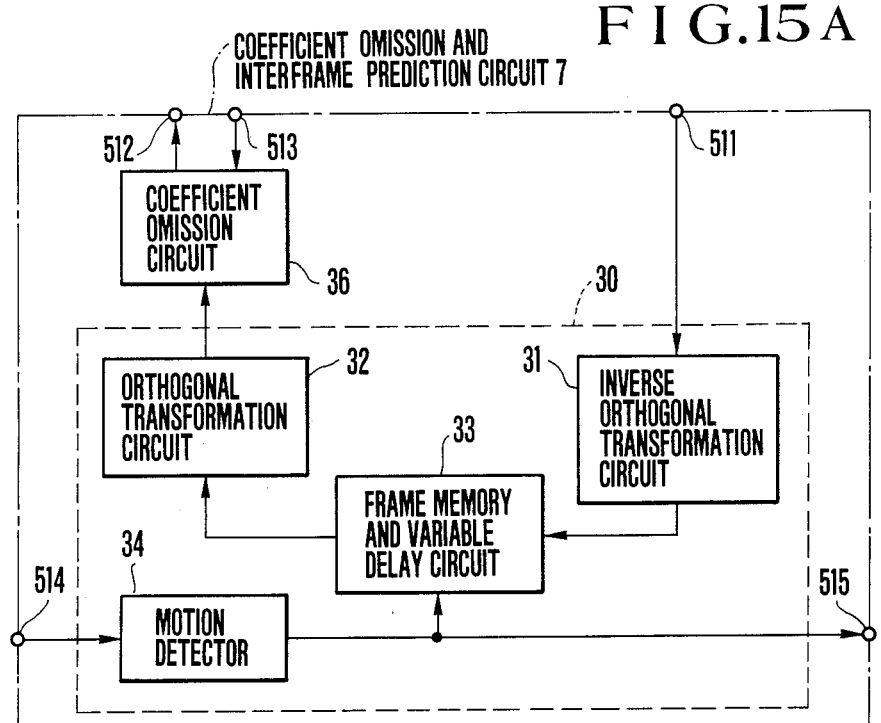
F I G. 15 B

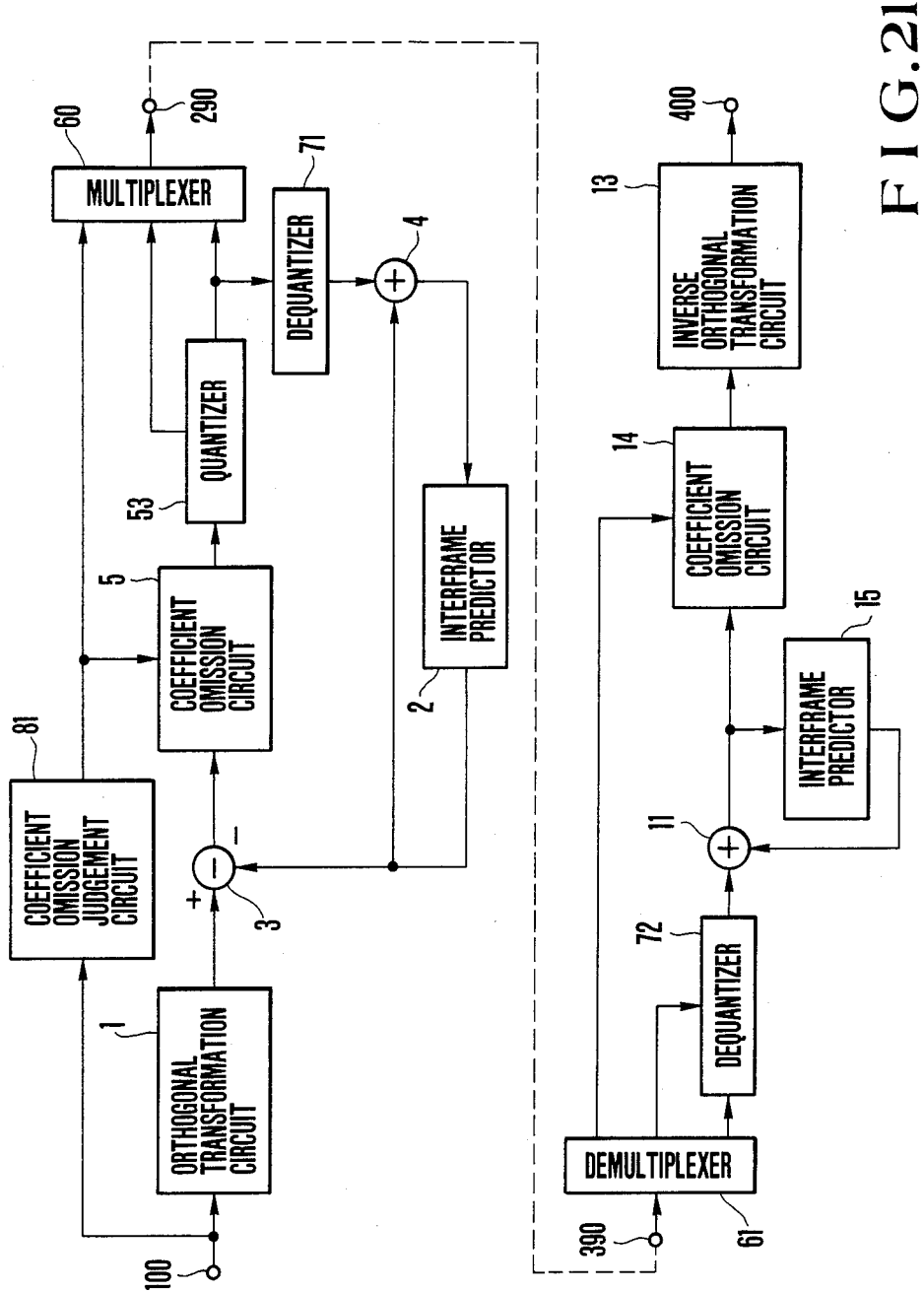
F I G. 21

METHOD AND APPARATUS FOR CODING MOTION IMAGE SIGNAL

BACKGROUND OF THE INVENTION

The present invention relates to a method and apparatus for coding/decoding a motion image signal.

A typical scheme for encoding a motion image signal by combining orthogonal transformation coding and interframe predictive coding is described in IEEE Transactions on Communications, Vol. COM-33, PP. 1291-1302, December 1985 (Reference 1). The configuration of a coder/decoder system described in Reference 1 is shown in FIG. 1. According to this system, a coder comprises an orthogonal transformation circuit 1, a subtracter 3, a quantizer 53, an adder 4, and a predictor 91, and a decoder comprises an adder 11, a predictor 92, and an inverse orthogonal transformation circuit 13. Reference numerals 100 and 300 denote input terminals; and 200 and 400, output terminals, respectively. According to this system, in the coder, an orthogonal transformation coefficient is coded according to interframe coding. In the decoder, the orthogonal transformation coefficient is decoded according to interframe decoding and is transformed according to inverse orthogonal transformation to obtain a decoded image. When an interframe difference of the orthogonal transformation coefficients is to be coded, all orthogonal transformation coefficients are quantized on the basis of identical quantization characteristics. The number of data to be generated is determined by changing a step size and a dead zone of the quantization characteristics.

In the 2nd International Technical Symposium on Optical and Electro Optical Applied Science and Engineering, SPIE Conf. B594, Image Coding, December 1985 (Reference 2), another conventional encoder/decoder system for performing orthogonal transformation coding of an interframe difference signal is described. The configuration of the encoder/decoder system in Reference 2 is shown in FIG. 2. In this encoder/decoder system, the encoder comprises a subtracter 51, an orthogonal transformation circuit 52, a quantizer 53, an inverse orthogonal transformation circuit 54, an adder 55, a frame memory 56, a predictor 57, a frame memory 58, a motion detector 59, and a multiplexer 60. The decoder of this system comprises a demultiplexer 61, an inverse orthogonal transformation circuit 62, an adder 63, a frame memory 64, and a predictor 65. Reference numerals 100 and 300 denote input terminals; and 200 and 400, output terminals, respectively. In the system shown in FIG. 2, the orthogonal transformation coefficients are divided into several groups which have variances, and the orthogonal transformation coefficients having small variances are omitted. Therefore, coding is performed at a predetermined bit rate while degradation of image quality of the decoded image signal is minimized. The scheme for coding the orthogonal transformation coefficients in FIG. 2 can be applied to the scheme for coding an interframe difference of the orthogonal transformation coefficients in FIG. 1.

FIGS. 3A and 3B respectively show two examples wherein the coding scheme for omitting the orthogonal transformation coefficients in FIG. 2 is used in the arrangement of Reference 1 of FIG. 1. More specifically, the coder in FIG. 3A performs coefficient omissions within the coding loop, while the coder in FIG. 3B performs coefficient omissions outside the coding loop. Each coder comprises an orthogonal transformation circuit 1, an interframe predictor 2, a subtracter 3, an adder 4, a coefficient omission circuit 5, and a coefficient omission judgement circuit 81. The coefficient omission judgement circuit 81 judges the magnitude of energy of the interframe difference signal and which coefficient is to be omitted. Reference numeral 100 denotes an input terminal of an image signal; 200, an output terminal of a coded image signal; and 210, an output terminal of mode information representing which coefficient is to be omitted. In the conventional systems described above, the following drawbacks are presented.

(1) In the system for coding orthogonal transformation coefficients according to interframe coding, when the number of coefficients to be omitted is increased, coding can be performed using a smaller number of data. When the coefficients are omitted, coding errors occur. However, if omissions are performed for the small coefficient values obtained by orthogonally transforming a current frame signal, coding errors are small. In the conventional system, coefficients to be omitted are determined by the magnitudes of the interframe differences. In the conventional system, therefore, if the orthogonal transformation coefficient of the current frame is small although that of the previous frame is large, the interframe difference is large, and these orthogonal transformation coefficients are not omitted but coded. More specifically, in the conventional system, although it is suitable to omit the small orthogonal transformation coefficient of the current frame and not to code it, the coefficient is coded since the interframe difference is large. Therefore, unnecessary coding is undesirably performed.

(2) In the conventional system, if an interframe prediction error is zero as a result of a coefficient omission, the coefficient of the previous frame is used as that of the current frame and is decoded in the decoder in the system. As a result, a signal waveform of the previous frame corresponding to the omitted coefficient is left in the decoded signal of the current frame. Image quality is greatly degraded. In particular, in a motion image portion, if coefficients having large interframe differences are omitted, a high-frequency component of the moving object, i.e., an edge is left in the background.

FIG. 4 is a view for explaining the above operation in correspondence with the arrangement of FIG. 1. FIG. 4 shows one-dimensional orthogonal transformation. Two waveforms in the block represent those of two of the orthogonal transformation coefficients. The amplitude of the waveform represents the magnitude of the coefficient. In this case, a DC component is not illustrated. Referring to FIG. 4, during coding of the previous frame, a locally decoded signal as in a waveform 508 is obtained. Assume that orthogonal transformation coefficients corresponding to waveforms 506 and 507 as components of the waveform 508 are sent to a decoder, and that a waveform 517 is obtained as a decoded signal. In a scheme for calculating a difference between the current and previous frame signals according to interframe coding, in the coder, the orthogonal transformation coefficients corresponding to the waveforms 506 and 507 are used as a current frame prediction signal output from the predictor 91 shown in FIG. 1. In the decoder, orthogonal transformation coefficients corresponding to waveforms 515 and 516 as components of a waveform 517 as an output from the predictor 92 in FIG. 1 are used as interframe prediction signals. When an input signal having a waveform 501 is to be coded in the current frame, an interframe difference between the orthogonal coefficients corresponding to the waveforms 502 and 503 as components of the waveform 501 and the orthogonal coefficients corresponding to the waveforms 506 and 507 is calculated. By this interframe difference calculation, orthogonal transformation coefficients corresponding to waveforms 504 and 505 are obtained. In the coefficient omission circuit 5, the orthogonal transformation coefficient corresponding to the waveform 504 is reserved, but the orthogonal transformation coefficient corresponding to the waveform 505 is omitted. As a result, the coefficients corresponding to waveforms 511 and 512 are coded. A circle in the coefficient omission circuit 5 represents preservation of the coefficient, and a cross represents omission of the coefficient. In the decoder, orthogonal transformation coefficients corresponding to waveforms 515 and 516 and predicted from the coefficient of the previous frame are output from the predictor 92 in FIG. 1, and orthogonal transformation coefficients of the current frame which correspond to waveforms 513 and 514 output from the predictor 92 in FIG. 1 are decoded. The orthogonal transformation coefficients corresponding to the waveforms 513 and 514 are subjected to inverse orthogonal transformation, thereby obtaining a decoded signal having a waveform 523. Orthogonal transformation coefficients used in prediction of a signal of the next frame are those corresponding to waveforms 509 and 510 in the coder and those corresponding to waveforms 518 and 519 in the decoder. These orthogonal transformation coefficients are input to the corresponding predictors 91 and 92 shown in FIG. 1. When the decoded waveform 523 is compared with the input waveform 501 and the decoded waveform 517 of the previous frame, the trailing edge of the ramp of the decoded waveform 523 is shifted to the right as compared with that of the input waveform and is similar to that of the waveform 517 of the previous frame.

(3) In Reference 2, image signals are divided into blocks, and interframe and intraframe coding schemes are employed in units of blocks. Although interframe coding is effective for a given orthogonal transformation coefficient in a given block since this coding scheme requires a small number of pixel data, another given orthogonal transformation coefficient in the given block may require intraframe coding in place of interframe coding. For example, assume that the frame is updated and an image pattern is slightly changed. In this case, interframe coding is effective for low orthogonal transformation coefficients since they are not greatly changed upon updating of the frame. However, high orthogonal transformation coefficients are greatly changed upon changing of the image pattern. In this case, intraframe coding may be better than interframe coding. In this manner, the amount of information cannot be greatly reduced according to the scheme in which the coding scheme is changed in units of blocks. According to a scheme using intraframe coding and interframe coding in units of orthogonal transformation coefficients, the number of data required for calculations can be reduced.

(4) According to the conventional schemes, omissions of the orthogonal transformation coefficients are determined according to the magnitudes of interframe difference signals. However, if man's sense of vision is taken into consideration, a resolution of the moving part can be low. By utilizing this phenomenon, the number of data can be further decreased.

SUMMARY OF THE INVENTION

It is an object of the present invention to provide a method and apparatus for efficiently coding a motion image signal in such a manner that if a value of an orthogonal transformation coefficient of a current frame is small although an interframe difference is large, the number of output data can be reduced while coding errors are minimized by omitting the coefficient.

It is another object of the present invention to provide a coder/decoder capable of eliminating conventional drawbacks described above.

It is still another object of the present invention to provide a coder of a motion image signal wherein the number of data can be smaller than in a scheme for changing a coding scheme in units of blocks.

It is still another object of the present invention to provide a coder/decoder wherein even if orthogonal transformation coefficients are omitted during coding, a decoded image signal is not adversely affected by the previous frame signal, thereby minimizing the degration of image quality of the motion image signal.

It is still another object of the present invention to provide a method and apparatus for effectively coding a motion image signal by utilizing the man's sense of vision indicating that a resolution of a moving portion can be low.

According to an encoding/decoding method of a motion image signal of the present invention, in an encoder, a difference between an orthogonal transformation coefficient obtained by orthogonally transforming an input image signal of a current frame and a current frame transformation coefficient predicted by the orthogonal transformation coefficient of the previous frame (i.e., the latter coefficient is a predicted orthogonal transformation coefficient in the encoder) is calculated, the difference signal is added to the predicted orthogonal transformation coefficient to locally decode the orthogonal transformation coefficient of the current frame to predict an orthogonal transformation coefficient of the next frame and the difference signal is sent to a decoder as an encoded image signal; while the orthogonal transformation coefficient is coded by interframe coding on the basis of the input image signal of the current frame, orthogonal transformation coefficients to be omitted are determined and then omitted, and the resultant information is sent to a decoder. In this method, in the decoder, the coded image signal from the encoder is added to the current frame orthogonal transformation coefficient predicted from the decoded orthogonal transformation coefficient of the previous frame, i.e., the predicted orthogonal transformation coefficient in the decoder to decode the orthogonal transformation coefficient of the current frame, the decoded orthogonal transformation coefficient of the current frame or the predicted orthogonal transformation coefficient in the decoder is transformed according to inverse transformation and the transformed coefficient is output as a decoded image signal, and coefficient omissions are performed for the predicted transformation coefficient of the decoder or the decoded orthogonal transformation coefficient of the current frame.

An encoder/decoder apparatus according to the present invention has one of the following arrangements.

(1) An apparatus comprises means for orthogonally transforming an input image signal, means for calculating a difference between an orthogonal transformation coefficient obtained by the orthogonal transformation and an output signal from an interframe predictor, means for omitting some of the orthogonal transformation coefficients of the outputs from the difference calculating means, means for adding an output from the coefficient omitting means and the output signal from the interframe predictor, the interframe predictor for predicting a signal of the next frame from an output signal from the adding means, output means for outputting as a decoded image the output signal generated by the coefficient omitting means, and means for receiving the input image signal, determining which orthogonal transformation coefficients are to be omitted by the coefficient omitting means, and outputting a result as mode information.

(2) An apparatus comprises means for orthogonally transforming an input image signal and omitting some of orthogonal transformation coefficients, means for calculating a difference between an output signal from the coefficient omitting means and an output signal from an interframe predictor, means for adding an output signal from the difference calculating means and the output signal from the interframe predictor, the interframe predictor for predicting a signal of the next frame on the basis of an output signal from the adding means, means for coding an output signal from the difference calculating means and outputting a result as a coded image signal, and means for determining which orthogonal transformation coefficients are to be omitted by the coefficient omitting means on the basis of the input image signal and outputting a determination result as mode information.

(3) An apparatus comprises means for orthogonally transforming an input image signal, means for calculating a difference between an orthogonal transformation coefficient obtained by an orthogonal transformation and an output signal from an interframe predictor, means for adding an output signal from the difference calculating means and the output signal from the interframe predictor, the frame predictor for predicting a signal of the next frame from an output signal from the adding means, means for omitting some of orthogonal transformation coefficients of the output signals from the difference calculating means, means for outputting as a coded image signal an output signal generated by the coefficient omitting means, and means for determining which orthogonal transformation coefficients are to be omitted by the coefficient omitting means on the basis of the input image signal and for outputting a determination result as mode information.

(4) An apparatus comprises means for orthogonally transforming an input image signal, means for calculating a difference between an orthogonal transformation coefficient obtained by an orthogonal transformation and an output signal from an interframe predictor, first omitting means for omitting some of orthogonal transformation coefficients of output ginals from the difference calculating means, second omitting means for omitting coefficients included in the output signal from the interframe predictor and associated with the orthogonal transformation coefficients omitted by the first omitting means, means for adding an output signal from the first omitting means and an output signal from the second omitting means, the interframe predictor for predicting a signal of the next frame from an output signal from the adding means, means for outputting as a coded image signal the output signal generated by the first omitting means, and means for generating mode information for designating which coefficients are omitted by the first and second omitting means.

(5) An apparatus comprises means for orthogonally transforming an input image signal, means for calculating a difference between an orthogonal transformation coefficient obtained by an orthogonal transformation and an output signal from an interframe predictor, means for omitting some of orthogonal transformation coefficients from output signals from the difference calculating means, means for adding an output signal from the omitting means and the output signal from the interframe predictor, the interframe predictor for omitting coefficients included in an output signal from the adding means and associated with the orthogonal transformation coefficients omitted by the omitting means and predicting a signal of the next frame on the basis of the resultant signal, or for predicting the signal of the next frame on the basis of the output signal from the adding means, omitting, orthogonal transformation coefficients associated with the coefficients omitted by the omitting means, from the predicted signal of the next frame, and outputting the resultant signal, means for outputting as a coded image signal the output signal generated by the omitting means, and means for generating mode information representing which coefficients are to be omitted by the omitting means.

(6) An apparatus comprises means for orthogonally transforming an input image signal, means for omitting some of orthogonal transformation coefficients obtained by orthogonal transformations, means for calculating a difference between an output signal from the omitting means and an output signal from an interframe predictor, means for adding an output signal from the difference calculating means and the output signal from the interframe predictor, the interframe predictor for omitting coefficients included in an output signal from the adding means and associated with the orthogonal transformation coefficients omitted by the omitting means and predicting a signal of the next frame on the basis of the resultant signal, or for predicting the signal of the next frame from the output signal fromtthe adding means, omitting, the coefficients associated with the coefficients omitted by the omitting means, form the signal of the next frame, and outputting the resultant signal, means for outputting as a coded image signal an output signal generated by the difference calculating means, and means for generating mode information representing which coefficients are to be omitted by the omitting means.

(7) An apparatus comprises means for orthogonally transforming an input image signal, means for calculating a difference between an orthogonal transformation coefficient obtained by an orthogonal transformation and an output signal from an interframe predictor, means for omitting some of the coefficients from an output signal from the difference calculating means, means for adding the output signal from the difference calculating means and the output signal from the interframe predictor, the interframe predictor for omitting coefficients included in an output signal from the adding means and associated with the orthogonal transformation coefficients omitted by the omitting means and predicting a signal of the next frame on the basis of the resultant signal, or for predicting the signal of the next frame from the output signal from the adding means, omitting, the coefficients associated with the coefficients omitted by the omitting means, from the signal of the next frame, and outputting the resultant signal, means for outputting as a coded image signal an output signal generated by the omitting means, and means for generating mode information representing which coefficients are to be omitted by the omitting means.

(8) An apparatus comprising means for orthogonally transforming an input image signal, means for omitting some of orthogonal transformation coefficients obtained by orthogonal transformations, means for calculating a difference between an output signal from the omitting means and the output signal from the interframe predictor, means for omitting coefficients from an output signal from the difference calculating means and associated with the orthogonal transformation coefficients omitted by the omitting means, means for adding an output signal from the difference calculating means and the output signal from the interframe predictor, the interframe predictor for predicting a signal of the next frame from the output signal from the adding means, means for outputting as a coded image signal an output signal generated by the omitting means, and means for generating mode information representing which coefficients are omitted by the omitting means.

The decoder according to the present invention employs one of the following arrangements.

(1) An apparatus comprises adding means for adding a coded image signal output from an encoder and an output signal from an interframe predicting means (to be described below), the interframe predicting means for predicting a signal of the next frame from an output signal from the adding means, coefficient omitting means for omitting some of orthogonal transformation coefficients of an output signal from the adding means on the basis of mode information output from the encoder, inverse orthogonal transforming means for performing an inverse orthogonal transformation of an output coefficient from the coefficient omitting means, and output means for outputting as a decoded image signal an output signal generated by the inverse orthogonal transforming means.

(2) An apparatus comprising means for adding an output signal from an interframe predictor to a coded image signal output from an encoder, means for omitting coefficients of an output signal from the adding means on the basis of mode information output from the encoder, the interframe predictor for predicting a signal of the next frame from an output signal from the omitting means, means for performing an inverse orthogonal transformation of the output signal from the interframe predictor, and means for outputting as a decoded image signal an output signal generated by the inverse orthogonal transforming means.

(3) An apparatus comprises means for adding a coded image signal output from an encoder and an output signal from an interframe predictor, the interframe predictor for predicting a signal of the next frame from an output signal from the adding means, omitting coefficients from the signal of the next frame on the basis of mode information output from the encoder and outputting the resultant signal, or for omitting the coefficients from an output signal from the adding means on the basis of the mode information output from the encoder and predicting the signal of the next frame on the basis of the resultant signal, means for performing an inverse orthogonal transformation of the output signal from the interframe predictor, and means for outputting as a decoded image signal an output signal generated by the inverse orthogonal transforming means.

BRIEF DESCRIPTION OF THE DRAWINGS

FIGS. 3A and 3B are block diagrams showing conventional encoders using coefficient omissions, respectively, as in FIGS. 1 and 2;

FIGS. 5, 6, and 7 are block diagrams showing encoders of a first type according to embodiments of the present invention;

FIG. 9 is a block diagram of a decoder according to still another embodiment of the present invention;

FIG. 10 is a block diagram of an encoder/decoder system using the encoder of the first type according to still another embodiment of the present invention;

FIGS. 15A, 15B, 16A, and 16B are block diagrams of coefficient omission and interframe predictors according to other embodiments of the present invention, respectively;

FIG. 21 is a block diagram of an encoder/decoder using the encoder of the fourth type according to still another embodiment of the present invention;

FIGS. 23A and 22B are views for explaining the operations of the circuits in FIGS. 22A and 22B.

DETAILED DESCRIPTION OF THE PREFERRED EMBODIMENTS

Figure 1:
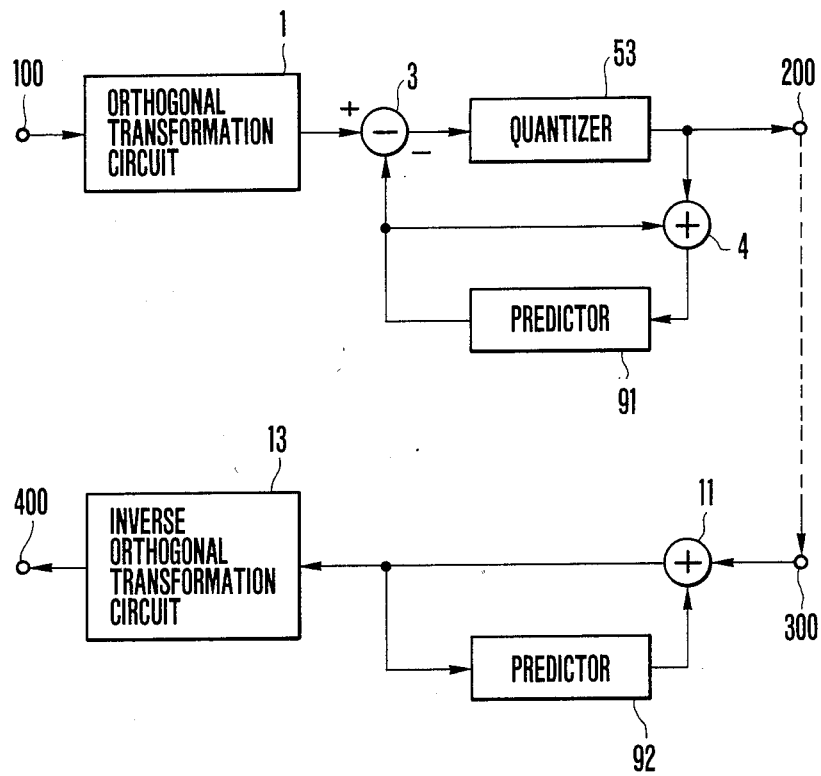
FIGS. 1 and 2 are block diagrams showing conventional encoder/decoder systems, respectively.
Figure 2:
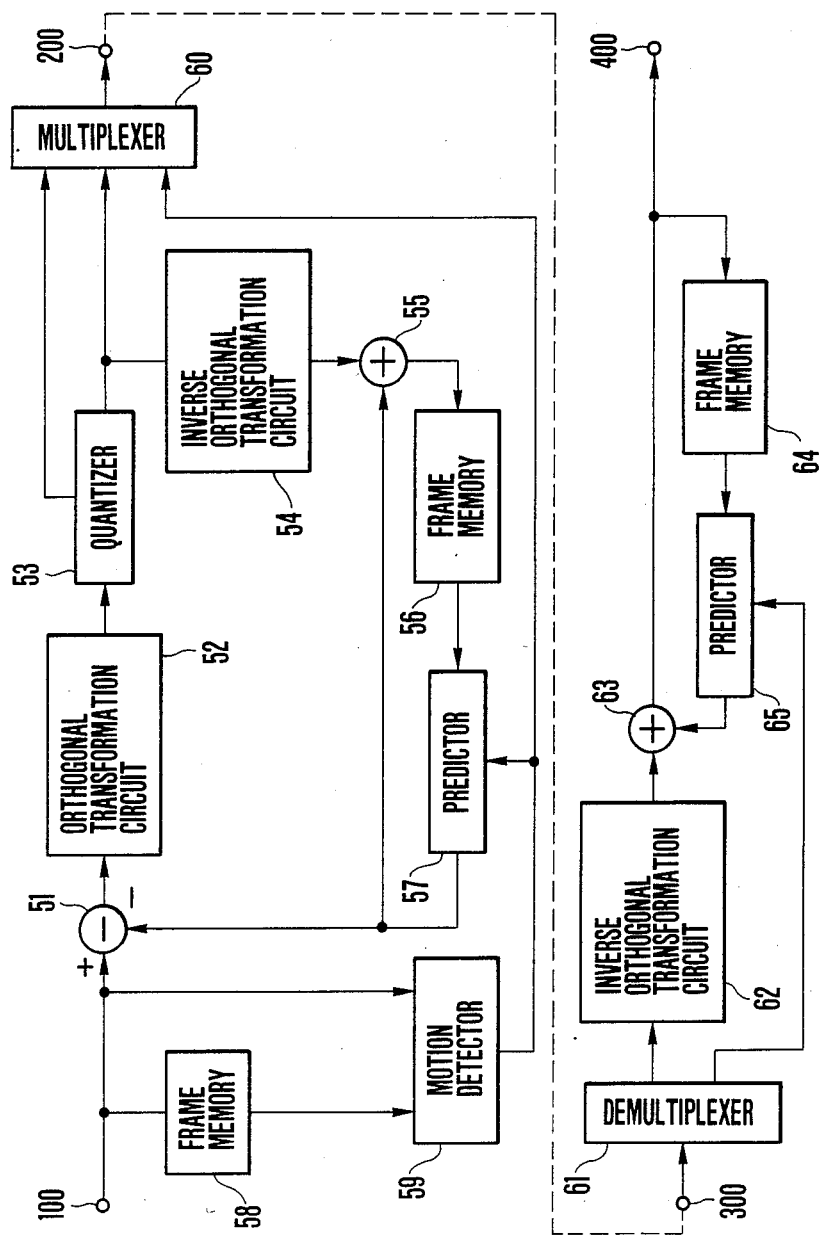

FIGS. 5, 6, and 7 show encoders according to embodiments of the present invention. The same reference numerals as in FIG. 3A denote the same parts in FIGS. 5, 6, and 7. Referring to FIG. 5, an image signal input from an input terminal 100 is orthogonally transformed by an orthogonal transformation circuit 1 and an output signal from an interframe predictor 2 is subtracted therefrom by a subtracter 3. An output signal from the subtractor 3 is subjected to the omission of some of the coefficients by a coefficient omission circuit 5 on the basis of mode information output from an omission coefficient judgement circuit 81. An output signal from the coefficient omission circuit 5 is output as a coded image signal from a terminal 200. The omission coefficient judgement circuit 81 generates the mode information representing which coefficients are to be omitted. The mode information is output from an output terminal 210. An adder 4 adds an output signal from the coefficient omission circuit 5 and an output signal from the interframe predictor 2. The interframe predictor 2 predicts a signal of the next frame from an output signal from the adder 4 and outputs the signal of the next frame.

Referring to FIG. 6, an image signal input from an input terminal 100 is orthogonally transformed by an orthogonal transformation circuit 1. Some of the coefficients are omitted by a coefficient omission circuit 5 on the basis of the mode information output from an omission coefficient judgement circuit 81. An output signal from an interframe predictor 2 is subtracted from an output signal from the coefficient omission circuit 5 by a subtracter 3 and the resultant signal is output as a coded image signal at a terminal 200. An adder 4 adds an output signal from the subtracter 3 and the output signal from the interframe predictor 2. The interframe predictor 2 predicts a signal of the next frame from an output signal from the adder 4 and outputs the signal of the next frame.

Referring to FIG. 7, an imag signal input from an input terminal 100 is orthogonally transformed by an orthogonal transformation circuit 1 and an output signal from an interframe predictor 2 is subtracted therefrom by a subtracter 3. An output signal from the subtracter 3 is added to the output signal from the interframe predictor 2 by an adder 4. The interframe predictor 2 predicts a signal of the next frame from an output signal from the adder 4 and outputs the signal of the next frame. A coefficient omission circuit 5 omits some of the output signal components from the subtracter 3 on the basis of the mode information output from an omission coefficient judgement circuit 81. An output signal from the coefficient omission circuit 5 is output as a coded image signal from an output terminal 200.

The arrangements shown in FIGS. 5, 6, and 7 are substantially identical except for the insertion positions of the coefficient omission circuits 5. The coefficient omission circuit 5 omits the coefficients on the basis of the mode information output from the omission coefficient judgement circuit 81 but does not judge coefficient omissions from the signal input thereto. A judgement scheme in the omission coefficient judgement circuit 81 is given as follows. For example, the coefficients can be omitted according to the pattern of an input image signal, e.g., a distribution of large orthogonal transformation coefficients of the input image signal. More specifically, coefficients having absolute values smaller than a threshold value are omitted. Another scheme is proposed wherein a distribution of coefficients having large absolute values is determined to resemble one of the coefficient patterns shown in FIGS. 8(a), 8(b), 8(c), 8(d), and 8(e) and coefficient omissions are performed on the basis of the determination result. These patterns in intraframe orthogonal transformation coding are described in IEEE Transactions on Communications, Vol. COM-25, PP. 1329-1339, November 1977 (Reference 3). A scheme for selecting one of the patterns is to calculate average power of each orthogonal transformation coefficient block within each pattern shown in FIGS. 8(a) to 8(e) and to select a pattern having a maximum power. The mode information may be a pattern address or a code as a combination of the pattern address and information representing the size of the pattern. The schemes in Reference 3 and the invention present invention are common in that orthogonal transformation is performed and the coefficients are omitted. However, the scheme in Reference 3 aims at coding for a still image and cannot be used for interframe coding. To the contrary, the present invention is a coding scheme for a motion image, thereby maximizing coding efficiency by interframe coding. A difference between Reference 3 and the encoder of FIG. 5 is that interframe coding is performed after orthogonal transformation coefficients are omitted in the encoder of FIG. 5. A difference between the scheme in Reference 3 and that of FIG. 6 is that coefficients are omitted within an interframe coding loop. Interframe coding is affected by coefficient omissions. A diffrence between the scheme of Reference 3 and that of FIG. 7 is that interframe coding is performed between the orthogonal transformation and the coefficient omission. In the arrangements shown in FIGS. 5, 6, and 7, mode information is output from the terminal 210. However, the mode information need not be information for designating only coefficients to be omitted. The mode information may be a signal derived from other coding information. In this case, the terminal 210 can be omitted. FIG. 9 is a decoder corresponding to one of the encoders shown in FIGS. 5, 6, and 7. Referring to FIG. 9, an encoded image signal input from an input terminal 300 is added to an output signal from an interframe predictor 15 by an adder 11. The interframe predictor 15 predicts a signal of the next frame from an output signal from the adder 11 and outputs the signal of the next frame. An output from the adder 11 is subjected to omissions of some of the coefficients in a coefficient omission circuit 14 on the basis of the mode information input to an input terminal 310. An output signal from the coefficient omission circuit 14 is transformed by an inverse orthogonal transformation circuit 13, and an output from the circuit 13 is output as a decoded image signal from a terminal 400.

FIG. 10 is a block diagram of an encoder/decoder system using the encoder of FIG. 5 and the decoder in FIG. 9 according to still another embodiment of the present invention. Referring to FIG. 10, this encoder is obtained by adding to the encoder of FIG. 5 a quantizer 53, a dequantizer 71, and a multiplexer 60 for selectively outputting a decoded image signal output from the quantizer 53, information representing quantization characteristics in the quantizer 53, and the mode information output from the omission coefficient judgement circuit 81. The decoder in FIG. 10 is obtained by adding to the decoder of FIG. 9 an input terminal 390, a demultiplexer 61 for separating the signal from the input terminal 390 into a decoded image signal, information representing the quantization characteristics, and the mode information, and a dequantizer 72. The quantizer 53, a dequantizer 71, and the multiplexer 60 may be built into each of the encoders shown in FIGS. 6 and 7.

Figure 11:
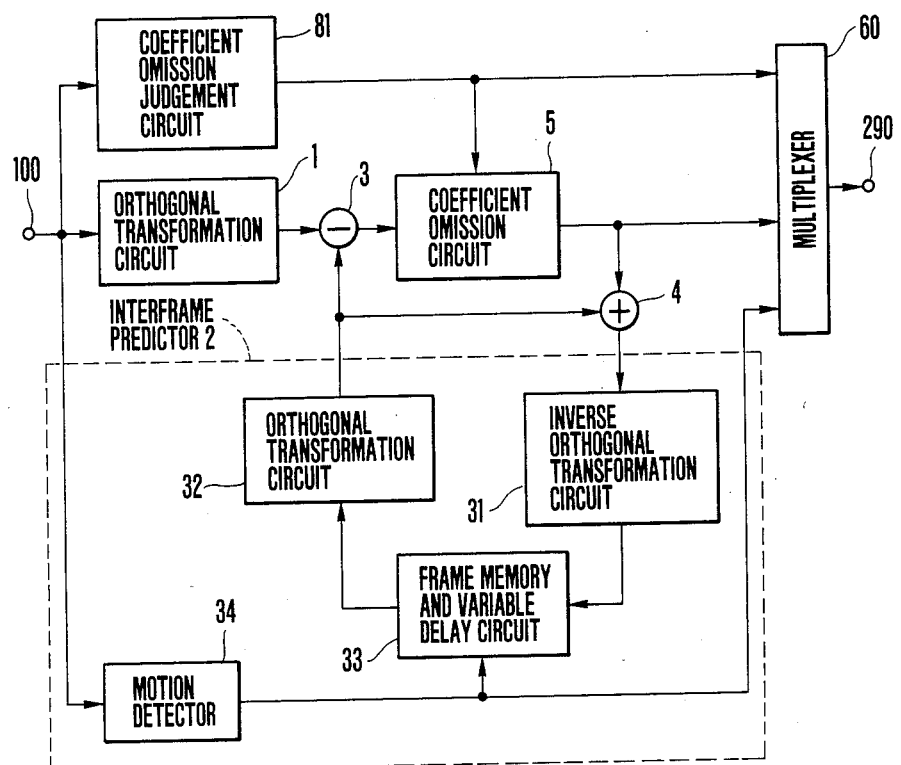
FIGS. 11A and 11B are block diagrams showing arrangements of an interframe predictor.
Figure 11:
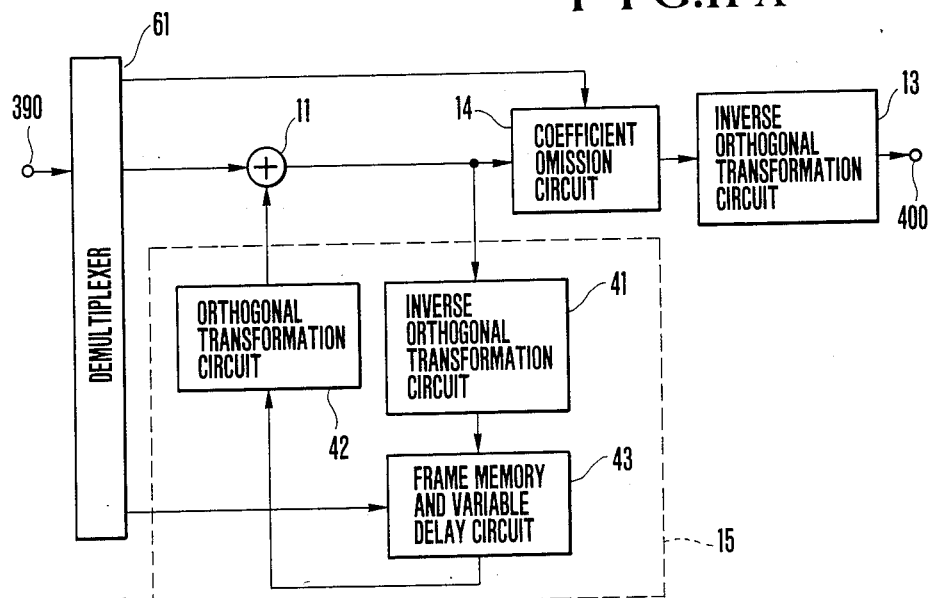
Figure 12:
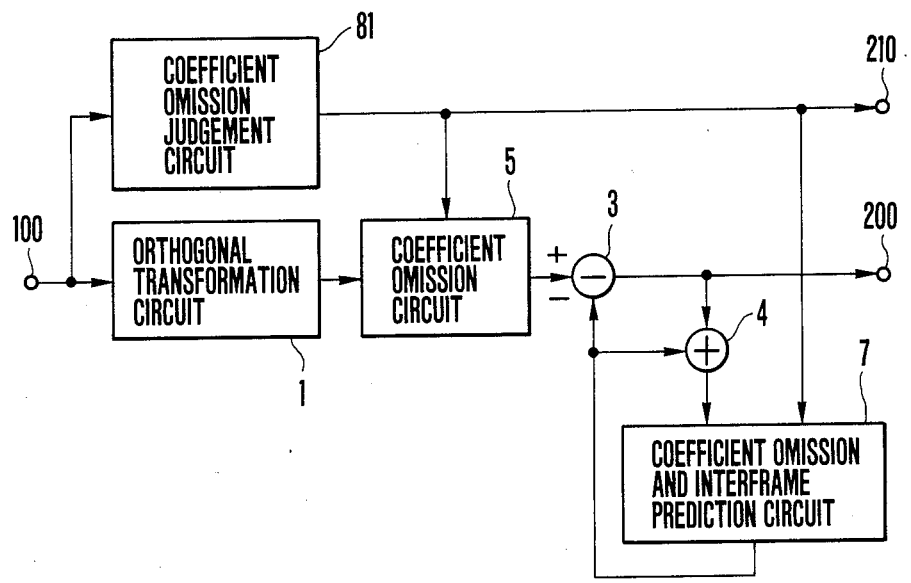
FIGS. 12A, 12B, 12C, 12D, and 12E are block diagrams of encoders of a second type according to other embodiments of the present invention.
Figure 12:
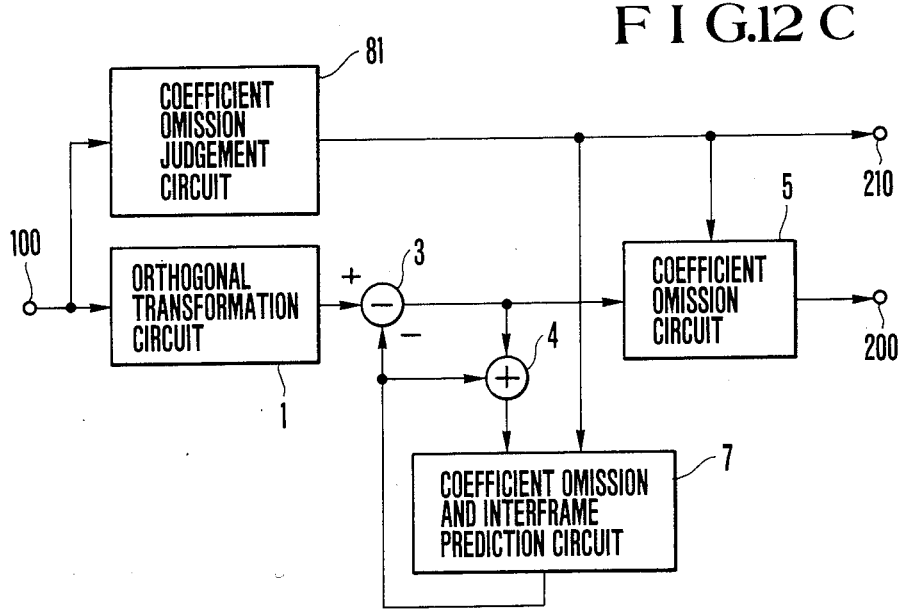
Figure 13:
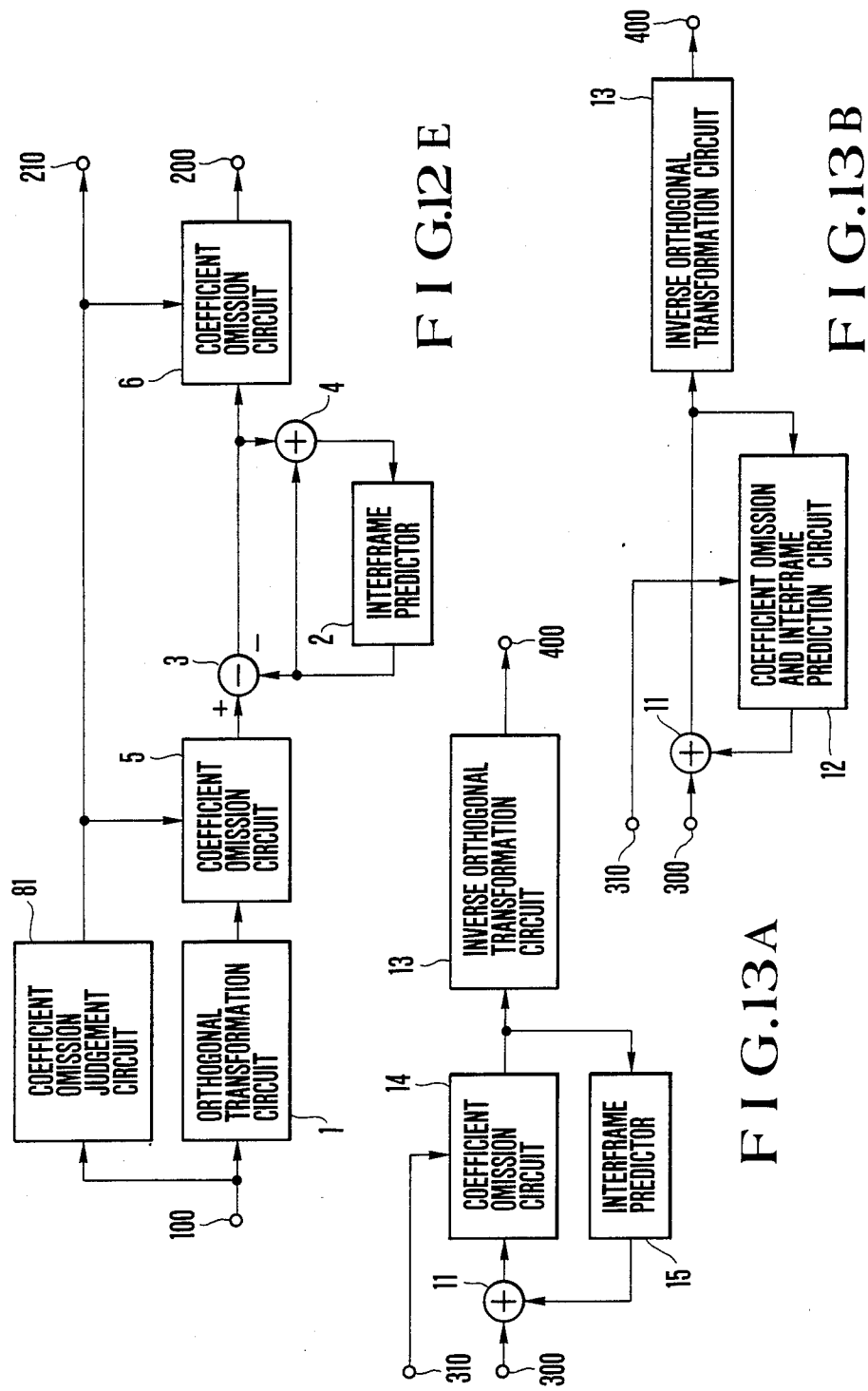
FIGS. 13A and 13B are block diagrams of decoders according to other embodiments of the present invention, respectively.

The interframe predictor 2 can be realized by simply delaying the input signal until the next frame. In this case, an interframe predictor 15 in the decoder also simply delays the input signal until the next frame. FIG. 11A shows an arrangement of the interframe predictor of the encoder of FIG. 5 wherein a motion compensation technique is introduced. Referring to FIG. 11A, an output signal from an adder 4 is transformed by an inverse orthogonal transformation circuit 31. A circuit 33 corrects an output signal from the inverse orthogonal transformation circuit 31 by a shift amount the image detected by a motion detector 34 and outputs a corrected signal as a signal of the next frame. An output signal from the circuit 33 is orthogonally transformed by an orthogonal transformation circuit 32. An output signal from the orthogonal transformation circuit 32 serves as an output image signal from the interframe predictor 2. The motion detector 34 calculates a shift amount of the image from the input image signal and outputs it as motion information to the circuit 33 and a multiplexer 60. The multiplexer 60 multiplexes motion information with the coded image signal and the mode information and outputs the resultant signal to an output terminal 290.

FIG. 11B shows an arrangement of the interframe predictor 15 in the decoder in FIG. 9, in which a motion compensation technique is introduced. A signal input from an input terminal 390 is separated by a demultiplexer 61 into a coded image signal, mode information, and motion information. An output signal from an adder 11 is transformed by an inverse orthogonal transformation circuit 41. A circuit 43 corrects an output signal from an inverse orthogonal transformation circuit 42 on the basis of the motion information output from the demultiplexer 61 and outputs the resultant signal as a predicted signal of the next frame. An output signal from the circuit 43 is transformed by an orthogonal transformer 42. An output signal from the orthogonal transformer circuit 42 serves as an output signal from the interframe predictor 15.

In the embodiments described with reference to FIGS. 5 to 11B, when the orthogonal transformation coefficient of the previous frame is large and that of the current frame is small, the orthogonal transformation coefficients are omitted, so that the motion image signal can be coded with a small number of data and small coding errors.

FIGS. 12A to 12E and FIGS. 13A and 13B show encoders and decoders according to other embodiments of the present inventions, respectively.

In an encoder in FIG. 12A, an image signal input from an input terminal 100 is orthogonally transformed in an orthogonal transformation circuit 1 and an output signal from an interframe predictor 2 is subtracted therefrom by a subtracter 3. A coefficient omission circuit 5 omits some of coefficients of the difference signal on the basis of the mode informtttion generated by an omission coefficient judgement circuit 81 and representing which coefficients are to be omitted. An output signal from the coefficient omission circuit 5 is output as a coded image signal from an output terminal 200. The mode information is output from an output terminal 210. A coefficient omission circuit 6 omits, from an output signal from the interframe predictor 2, coefficients associated with coefficients omitted by the coefficient omission circuit 5. The adder 4 adds output signals from the coefficient omission circuits 5 and 6. The interframe predictor 2 predicts a signal of the next frame from an output signal from an adder 4 and outputs the predicted signal.

In an encoder in FIG. 12B, an image signal input from an input terminal 100 is orthogonally transformed by an orthogonal transformation circuit 1 and an output signal of a circuit 7 is subtracted therefrom by a subtracter 3. A coefficient omission circuit 5 omits some of the coefficients of the difference signal on the basis of the mode information generated by an omission coefficient judgement circuit 81. An output signal from the coefficient omission circuit 5 is output as a coded image signal from an output terminal 200. Mode information is output from an output terminal 210. An adder 4 adds an output signal from the coefficient omission circuit 5 and an output signal from the circuit 7. The circuit 7 omits coefficients (of the output signal from the adder 4) associated with the coefficients omitted by the coefficient omission circuit 5 and uses the resultant signal to predict a signal of the next frame. Alternatively, the circuit 7 predicts the signal of the next frame from the output signal from the adder 4, omits the coefficients (of this signal) associated with the coefficients omitted by the coefficient omission circuit 5 from the predicted signal, and outputs the resultant signal.

In an encoder in FIG. 12C, an image signal input from an input terminal 100 is orthogonally transformed by an orthogonal transformation circuit 1, and some of the coefficients are omitted by a coefficient omission circuit 5 on the basis of the mode information generated by a coefficient omission judgement circuit 81. An output signal from the circuit 7 is subtracted from an output signal from the coefficient omission circuit 5 by a subtracter 3. An output signal from the subtracter 3 is output as a coded image signal from an output terminal 200. The mode information is output from an output terminal 210. An adder 4 adds an output signal from the subtracter 3 and an output signal from the circuit 7. The circuit 7 omits coefficients included in an output signal from the adder 4 and associated with the coefficients omitted by the coefficient omission circuit 5, and predicts and outputs a signal of the next frame on the basis of the resultant signal. Alternatively, the circuit 7 predicts the signal of the next frame from the output signal from the adder 4, omits coefficients included in the signal of the next frame and associated with the coefficients omitted by the coefficient omission circuit 5, and outputs the resultant signal.

In an encoder shown in FIG. 12D, an image signal input from an input terminal 100 is orthogonally transformed by an orthogonal transformation circuit 1 and is subtracted from an output signal from a circuit 7 by a subtracter 3. A coefficient omission circuit 5 omits some of coefficients of the difference signal on the basis of mode information generated by a coefficient omission judgement circuit 81. An output signal from the coefficient omission circuit 5 appears as a coded output signal at an output terminal 200. The mode information is output from an output terminal 210. An adder 4 adds an output signal from the subtracter 3 and an output signal from the circuit 7. The circuit 7 omits coefficients included in the output signal from the adder 4 and associated with the coefficients omitted by the coefficient omission circuit 5, and predicts and outputs a signal of the next frame from the resultant signal. Alternatively, the circuit 7 predicts the signal of the next frame from the output signal from the adder 4, omits coefficients included in the predicted signal and associated with the coefficients omitted by the coefficient omission circuit 5, and outputs the resultant signal.

In an encoder shown in FIG. 12E, an image signal input from an input terminal 100 is orthogonally transformed by an orthogonal transformation circuit 1, and some coefficients are omitted by a coefficient omission circuit 5 on the basis of mode information generated by a coefficient omission judgement circuit 81. An output signal from an interframe predictor 2 is subtracted from an output signal from the coefficient omission circuit 5 by a subtracter 3. Coefficients included in an output signal from the subtracter 3 and associated with the coefficient omitted by the coefficient omission circuit 5 are omitted by a coefficient omission circuit 6. An output signal from the coefficient omission circuit 6 is output as a coded image signal from an output terminal 200. A coefficient omission judgement circuit 81 generates the mode information representing which coefficients are to be omitted. The mode information is output from an output terminal 210. An adder 4 adds an output signal from the subtracter 3 and an output signal from the interframe predictor 2. The interframe predictor 2 predicts a signal of the next frame from the output signal from the adder 4 and outputs a predicted signal.

In the encoders shown in FIGS. 12A to 12E, each encoder includes two coefficient omission circuits. In this case, the coefficients omitted by the two coefficient omission circuits may be the same or different from each other.

In a decoder shown in FIG. 13A, an encoded image signal input from an input terminal 300 is added to an output signal from an interframe predictor 15 by an adder 11. Some coefficients rre omitted by a coefficient omission circuit 14 on the basis of mode information input from an input terminal 310. An output sinal from the coefficient omission circuit 14 is transformed by an inverse orthogonal transformation circuit 13 and is output as a decoded image signal from a terminal 400. An interframe predictor 15 predicts a signal of the next frame from an output signal from the coefficient omission circuit 14 and outputs the predicted signal.

In a decoder shown in FIG. 13B, an encoded image signal input from an input terminal 300 is added to an output signal from a circuit 12 by an adder 11. An output from the adder 11 is transformed by an inverse orthogonal transformation circuit 13 and appears as a decoded image signal from a terminal 400. The circuit 12 omits some coefficients of the output signal from the adder 11 on the basis of mode information input from an input terminal 310 and predicts a signal of the next frame from the resultant signal. Alternatively, the circuit 12 predicts the signal of the next frame from the output signal from the adder 11, omits some coefficients of the predicted signal on the basis of the mode information input from the input terminal 310, and outputs the resultant signal.

A difference between the arrangements in FIGS. 12A and 12B is that the orthogonal transformation coefficient of the previous frame is omitted by the coefficient omission circuit 6 when the orthogonal transformation coefficient of the current frame is locally decoded by the adder 4 in FIG. 12A, while the orthogonal transformation coefficient of the current frame is locally decoded by the adder 4 and the coefficients are omitted by the circuit 7 in FIG. 12B. Referring to FIGS. 12A and 12B, identical coded image signals can be obtained in response to identical input signals. A difference between the arrangements in FIGS. 12B, 12C, and 12D is that the interframe predicted error signal of the orthogonal transformation coefficient as an output from the subtracter 3 is subjected to coefficient omissions in FIG. 12B, coefficient omissions are performed for the signal prior to the calculation of the interframe predicted error signal from the subtracter 3 in FIG. 12C, and coefficient omissions are performed after the signal input to the adder 4 is separated and the interframe prediction loop is completed. Identical coded image signals can be obtained in response to identical input image signals in FIGS. 12B, 12C, and 12D. Referring to FIG. 12E as compared with FIG. 12C, coefficient omissions performed in the circuit 7 in FIG. 12C are omitted in FIG. 12E but are performed by the coefficient omission circuit 6 after the interframe prediction loop. When a given orthogonal transformation coefficient is omitted, this coefficient is omitted from the coded image signal in FIG. 12C, and at the same time, this coefficient is omitted from the current frame as the source of interframe prediction. However, in FIG. 12E, that orthogonal coefficient is not omitted from the coded image signal but is omitted from the current frame as the source of interframe prediction. However, when that orthogonal transformation coefficient is omitted in coding of the next frame, this coefficient is canceled during local interframe decoding, and the resultant signal is input to the interframe predictor 2. When the interframe prediction loop is completed, the above coefficient is omitted by the coefficient omission circuit 6. Therefore, the coefficient is not sent to the decoder, and the same coded image signal as in the encoder in FIG. 12C can be obtained.

A difference between the decoders in FIGS. 13A and 13B is that the orthogonal transformation coefficient of the current frame is decoded by the adder 11 and then omitted by the coefficient omission circuit in FIG. 13A, while a coefficient omission is performed in the coefficient omission and interframe predictor 12 in FIG. 13B. Referring to FIG. 13B, when the orthogonal coefficient of the current frame obtained by interframe prediction by the circuit 12 is to be omitted, the same decoded image signal as that of the decoder of FIG. 13A can be obtained in FIG. 13B. Referring to FIG. 13B, when the orthogonal transformation coefficient decoded by the circuit 12 is to be omitted and then interframe prediction is performed therefor, the resultant decoded signal may vary depending on the operating order of the circuit elements. In this case, assuming that the decoded coefficient of the previous frame is omitted by the circuit 12 on the basis of the mode information of the current frame, that interframe prediction is then performed, and that the orthogonal transformation coefficient of the current frame is finally decoded by interframe decoding, the same decoded image signal as that of the decoder shown in FIG. 13A can be obtained.

The mode information output from the encoder via the terminal 210 and input to the decoder via the terminal 310 may be information directly designating which coefficient is to be omitted or information representing one of the pattern numbers representing several coefficient patterns. The mode information need not be information representing only coefficient omissions and may be derived from other coding information.

Figure 14:
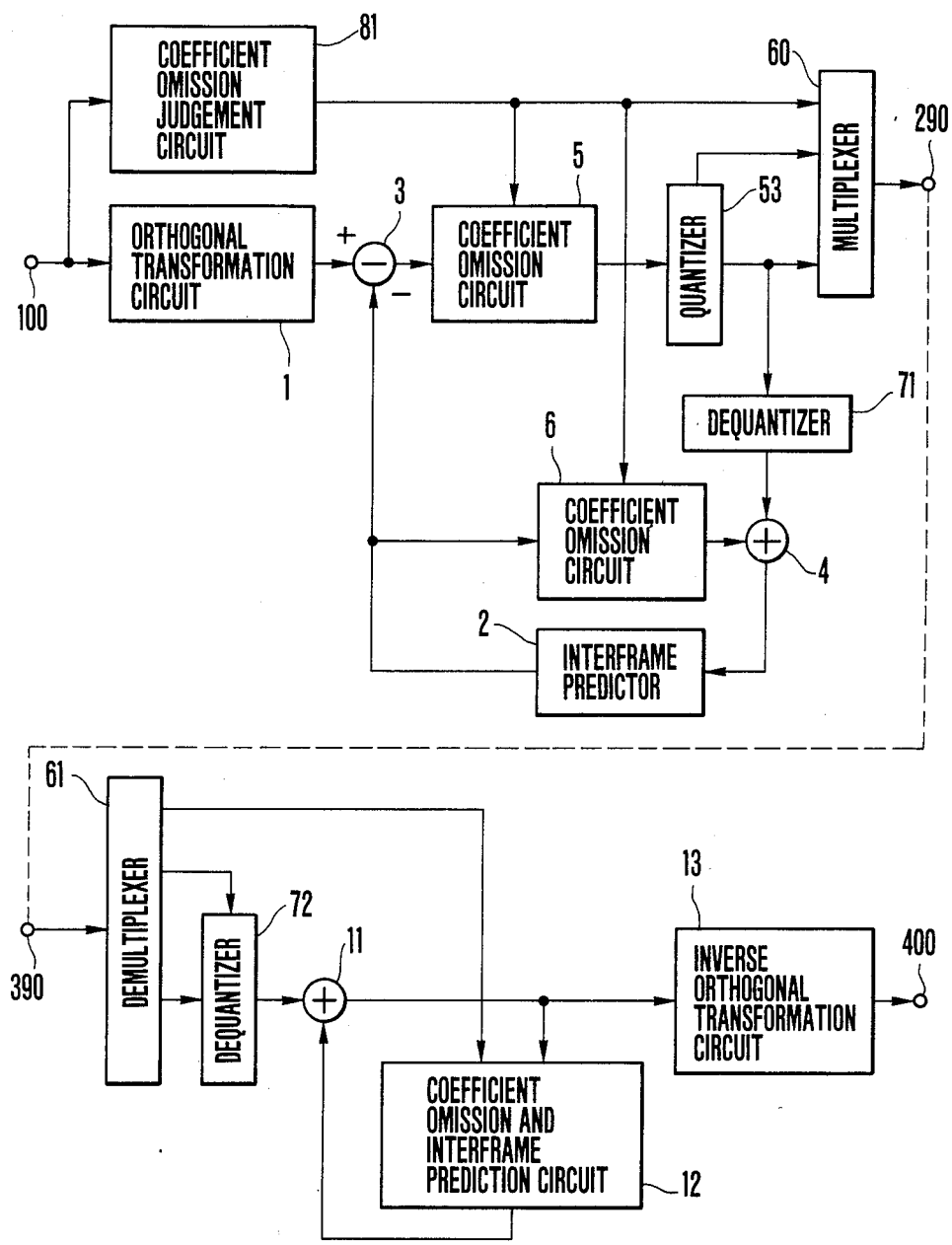
FIG. 14 is a block diagram of an encoder/decoder system using the encoder of the second type according to another embodiment of the present invention.

FIG. 14 is a block diagram of an encoder/decoder system using the encoder of FIG. 12A and the decoder of FIG. 13A according to still another embodiment of the present invention. Referring to FIG. 14, in the decoder, reference numeral 100 denotes an input terminal; 1, an orthogonal transformation circuit; 3, a subtracter; 5 and 6, coefficient omission circuits; 53, a quantizer; 71, an dequantizer; 4, an adder; 2, an interframe predictor; 81, a coefficient omission judgement circuit; and 60, a multiplexer for selectively outputting to an output terminal 290 an encoded image signal output from the quantizer 53, the information representing the quantization characteristics of the quantizer 53, and the mode information output from the coefficient omission judgement circuit 81. The decoder in FIG. 14 has an input terminal 390, a demultiplexer 61 for separating the signal from the input terminal 390 into the encoded image signal, the quantization information, and the mode information, a dequantizer 72, and an adder 11. The decoder also includes a coefficient omission and interframe predictor 12 and an inverse orthogonal transformation circuit 13. The coefficient omission and interframe predictor 12 omits some coefficients of the output signal from the adder 11, predicts a signal of the next frame from the resultant signal, and outputs the signal of the next frame. Alternatively, the predictor 12 predicts the signal of the next frame from the output signal from the adder 11, omits some coefficients of the resultant signal on the basis of the mode information and outputs the resultant signal. An output signal from the inverse orthogonal transformation circuit 13 appears as a decoded image signal at an output terminal 400. The quantizer 53, the dequantizer 71, and the multiplexer 60 in the encoder in FIG. 14 can be built into one of the encoders in FIGS. 12B to 12E. The demultiplexer 61 and the dequantizer 72 in the decoder in FIG. 14 may be built into the decoder in FIG. 13B.

An arrangement for the interframe prediction function included in the interframe predictor 2 or the circuit 7 is realized by simply delaying the input signal until the next frame. The interframe prediction function included in the interframe predictor 15 or the circuit 12 in the decoder can also be realized by simply delaying the input signal until the next frame. The used interframe predictors 2 and 15 are shown in FIGS. 11A and 11B, respectively.

Figure 16A:
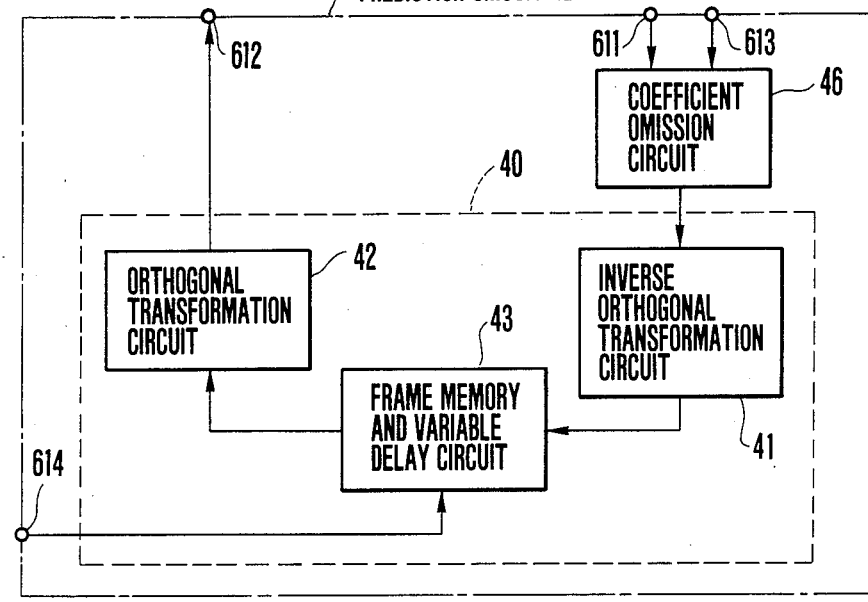
Figure 16B:
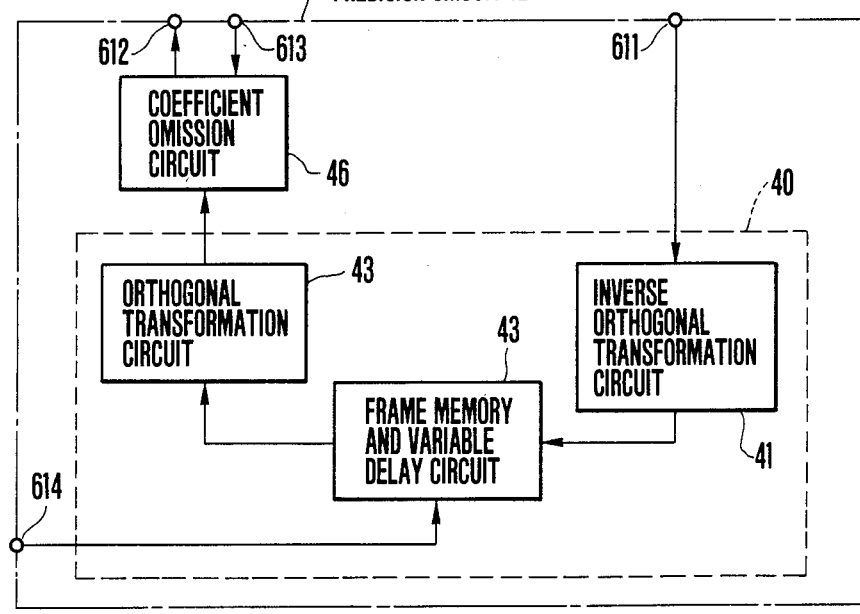

Motion compensation can be used in the coefficient omission and interframe predictors 7 and 12. FIGS. 15A and 15B show arrangements of the circuit 7, and FIGS. 16A and 16B show arrangements of the circuit 12. Referring to FIGS. 15A and 15B, an output signal from an adder 4 is input from a terminal 511, and mode information output from a coefficient omission judging circuit 81 is input from a terminal 513. An input image signal is input from a terminal 514. An image signal processed by the circuit 7 is output from a terminal 512. Motion information is output from a terminal 515. A circuit 30 surrounded by the broken line is the same as that of the interframe predictor 2. Referring to FIG. 15A, a signal input from the terminal 511 is processed by a coefficient omission circuit 35 and then processed by the circuit 30. The processed signal is output to the output terminal 512. Referring to FIG. 15B, a signal input from the input terminal 511 is processed by the circuit 30 and then a coefficient omission circuit 36. The processed signal is output to the output terminal 512. Referring to FIGS. 16A and 16A, a circuit 40 surrounded by the broken line is the same as the interframe predictor 15. Referring to FIG. 16B, a signal input from an input terminal 611 is processed by the circuit 40 and output to the output terminal 612. Referring to FIG. 16B, the processed signal is further processed by a coefficient omission circuit 41, and the resultant signal appears at the output terminal 612.

Figure 4:
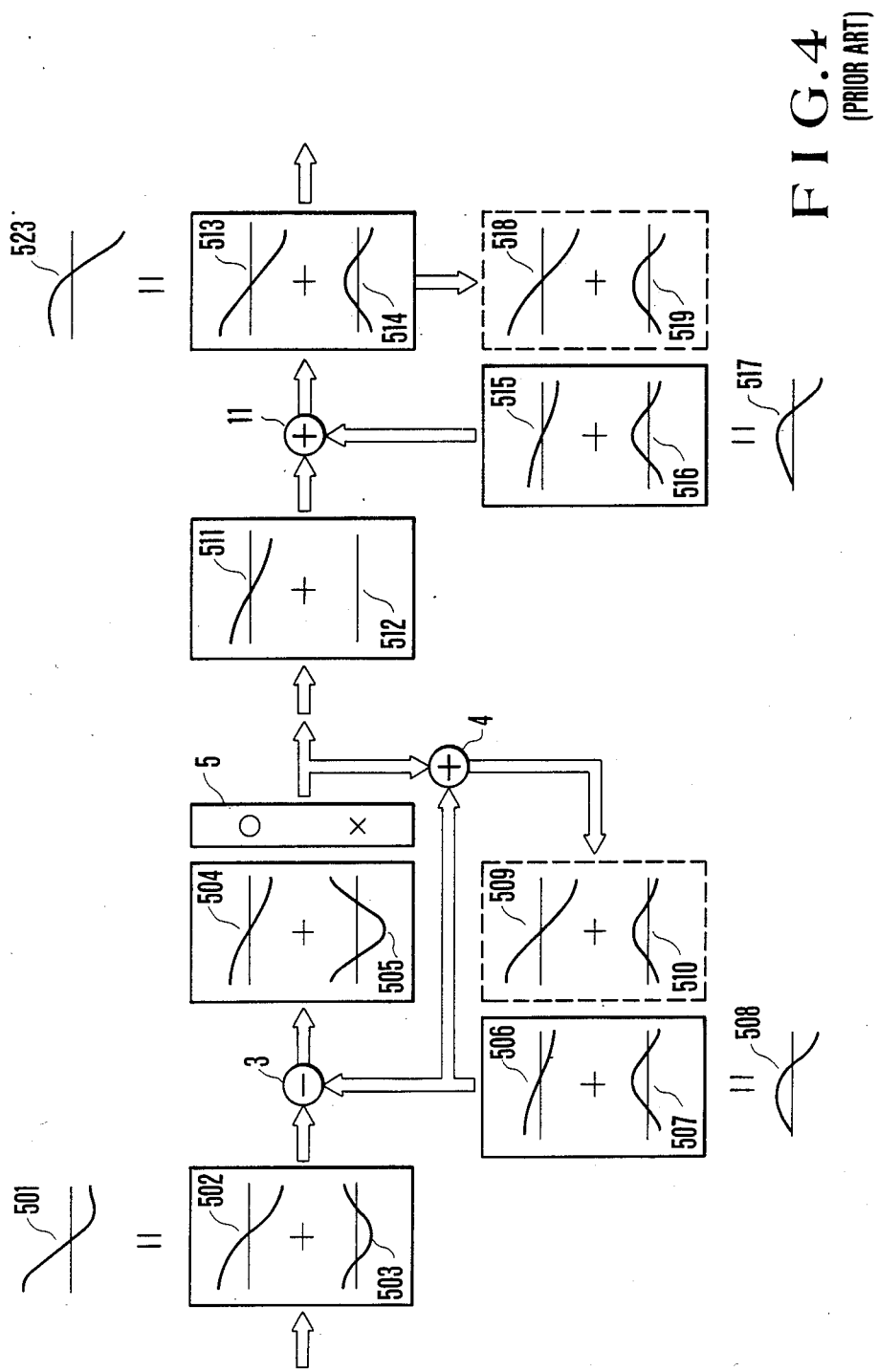
FIG. 4 is a view for explaining the conventional system.
Figure 8A:
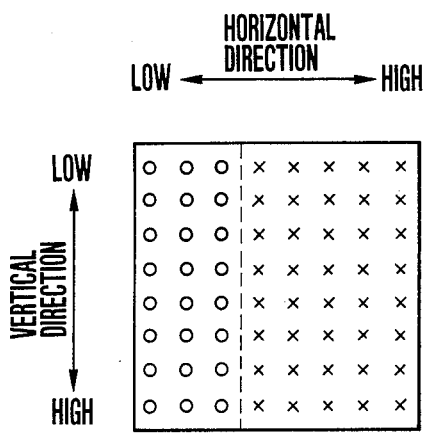
FIGS. 8(a) to 8(e) are views for explaining judgement results of coefficient omissions by a coefficient omission judgement circuit.
Figure 8B:
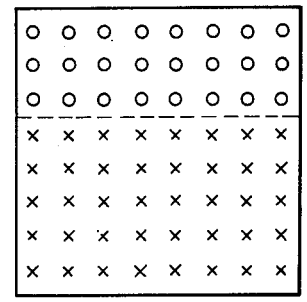
Figure 8C:
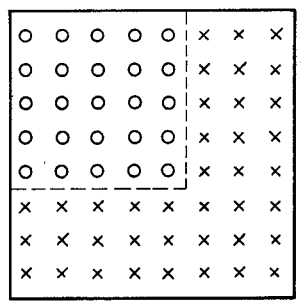
Figure 8D:
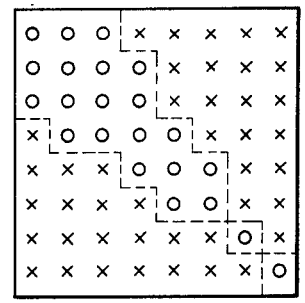
Figure 8E:
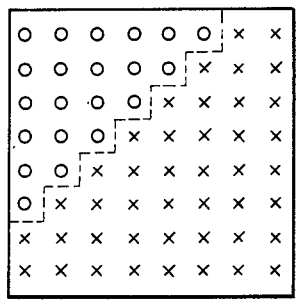
Figure 17:
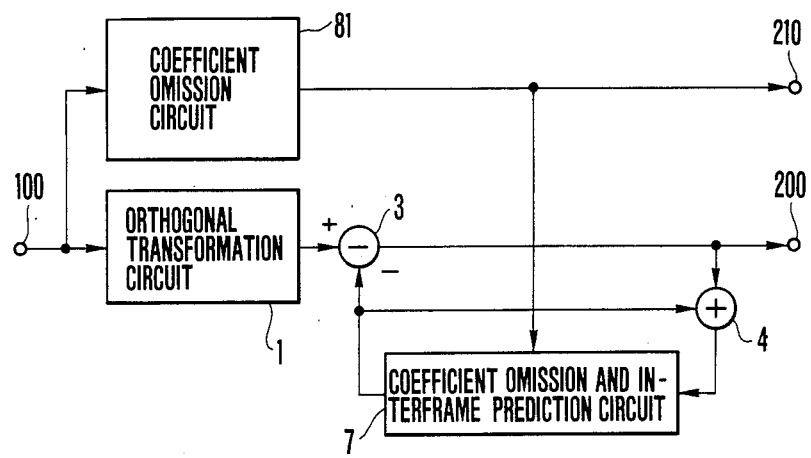
FIG. 17 is a block diagram of an encoder of a third type according to still another embodiment of the present invention.

FIG. 17 is a view for comparing the operations of the circuits in FIGS. 12A to 16B with the operation of the conventional circuit shown in FIG. 4. Referring to FIG. 17, in the decoding process, when orthogonal transformation coefficients corresponding to waveforms 513 and 514 as the interframe decoded signal of the current frame are decoded, the transformation coefficient corresponding to a waveform 505 which has already been omitted by the encoder is omitted by the coefficient omission circuit 14, thereby obtaining the orthogonal transformation coefficients corresponding to waveforms 520 and 521. These coefficients are then transformed according to the inverse orthogonal transformation, and therefore, an output signal waveform 522 is obtained. In the decoder, when the orthogonal transformation coefficient of the current frame is locally decoded, the orthogonal transformation coefficient corresponding to the omitted waveform 505 is omitted by the coefficient omission circuit 6, and the orthogonal transformation coefficients corresponding to waveforms 530 and 531 are obtained. The waveform 522 is similar to the input waveform 501 as compared with the waveform 523 concerning the trailing edge and the zero-crossing point. Therefore, a difference between the levels of the waveforms 501 and 522 is small. This tendency is conspicuous when a difference between the coefficient value omitted in the current frame and the corresponding coefficient value in the previous frame is large. As is apparent from the description, according to this embodiment, as compared with the conventional scheme wherein the coefficients are not omitted by the decoder and the signal waveform of the transformation coefficient of the previous frame is left in the decoded signal of the current frame, such a phenomenon can be minimized, and image quality is not degraded.

Figure 18:
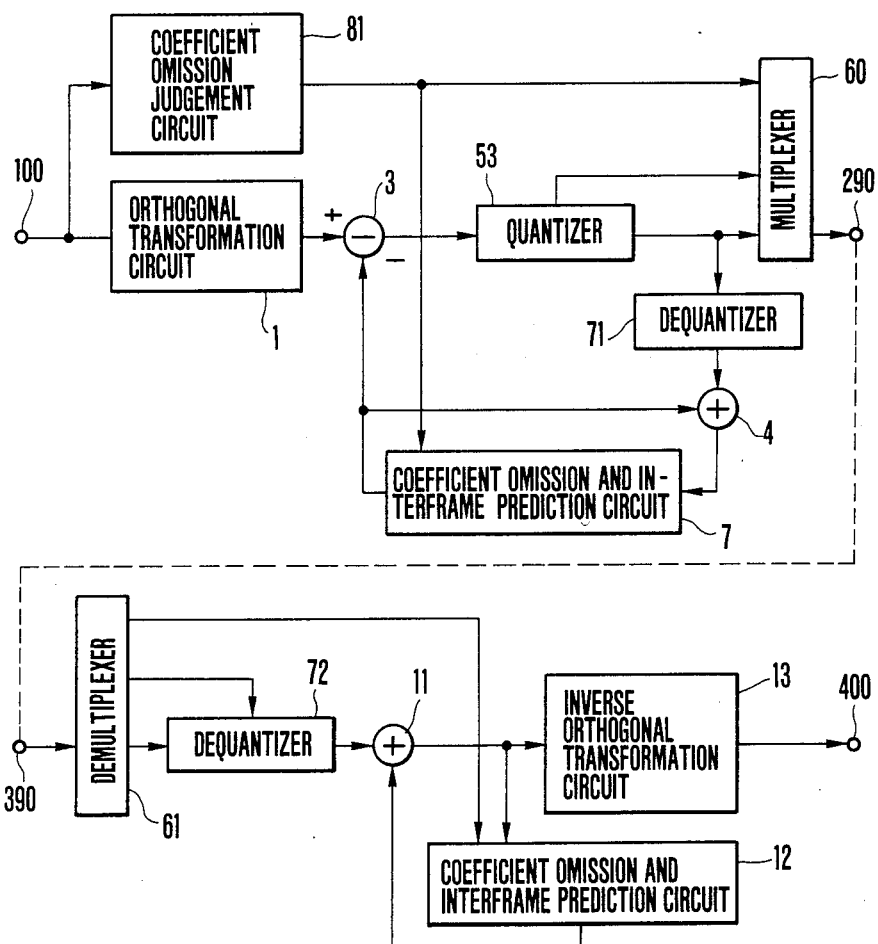
FIG. 18 is a block diagram of an encoder/decoder using the encoder of FIG. 17 according to still another embodiment of the present invention.

FIG. 18 is a block diagram of an encoder according to still another embodiment of the present invention. Referring to FIG. 18, an image signal input from an input terminal 100 is orthogonally transformed by an orthogonal transformation circuit 1 and an output signal from a circuit 7 is subtracted therefrom by a subtracter 3. An output signal from the subtracter 3 appears as a coded image signal at an output terminal 200. An adder 4 adds an output signal from the subtracter 3 and the output signal from the circuit 7. The circuit 7 omits some coefficients of the output signal from the adder 4 on the basis of mode information generated by a coefficient omission judgement circuit 81, predicts a signal of the next frame from the resultant signal and outputs the predicted signal. Alternatively, the circuit 7 predicts the signal of the next frame from the output signal from the adder 4, omits some coefficients of the predicted signal on the basis of the mode information generated by the coefficient omission judgement circuit 81, and outputs the resultant signal. The coefficient omission judgement circuit 81 generates the mode information representing which coefficient is omitted. The mode information is generated at the output terminal 210.

Figure 19:
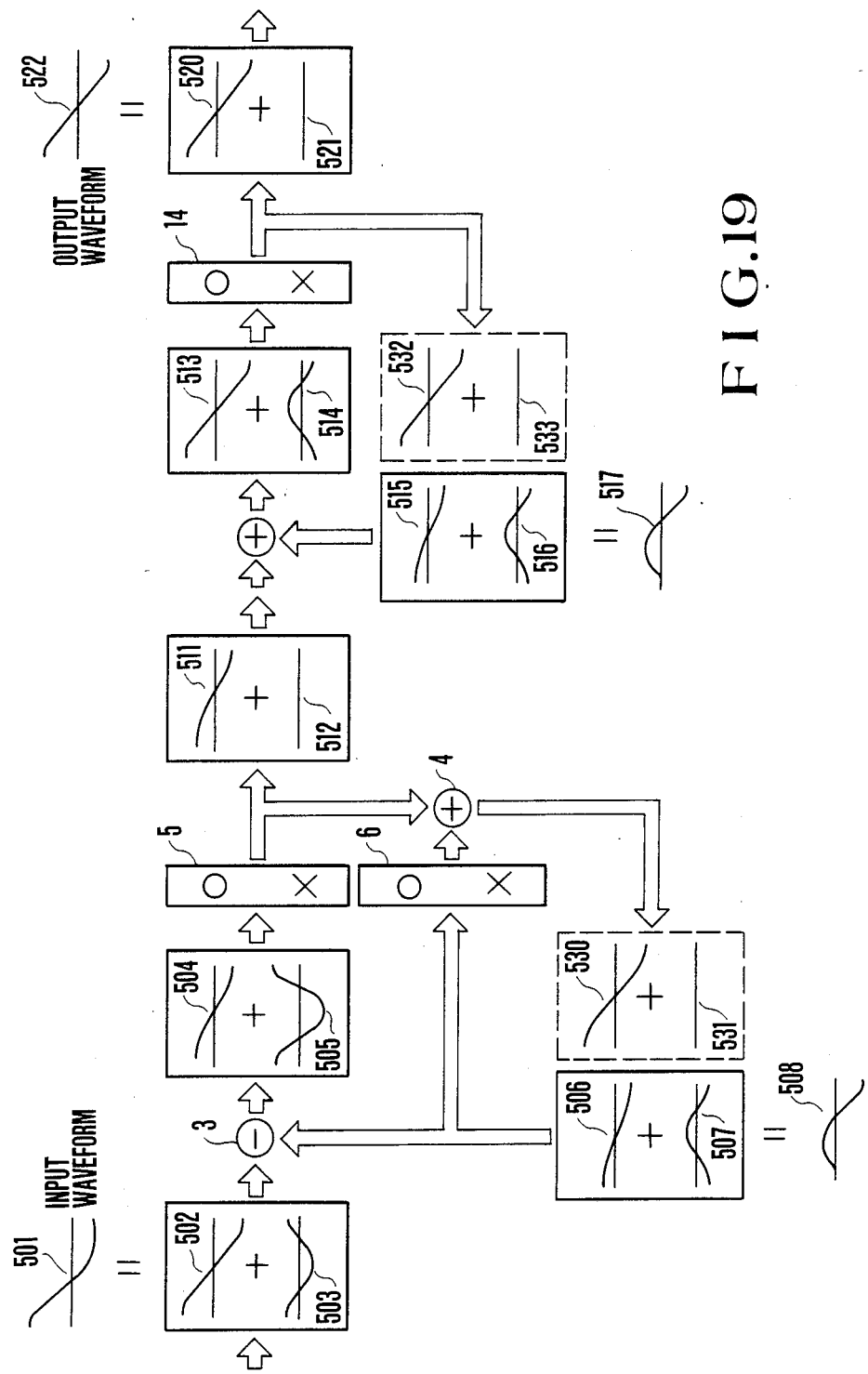
FIG. 19 is a view for explaining the operation of the system shown in FIG. 18.

FIG. 19 is a block diagram of an encoder/decoder system using the encoder shown in FIG. 18. The encoder in FIG. 19 is arranged by adding a quantizer 53, a dequantizer 71, and a multiplexer 60 to the arrangement of FIG. 18. The decoder in FIG. 19 is the same as that of FIG. 14. Coefficient omission and interframe predictors 7 and 14 are the same as that shown in FIG. 15A or 15B and that shown in FIG. 16A or 16B, respectively.

In coding of orthogonal transformation coefficients in the above embodiment, interframe coding and intraframe coding can be switched in units of coefficients even within a single block. The number of data can be reduced as compared with a conventional scheme in which interframe coding and intraframe coding are switched in units of blocks.

Figure 20A:
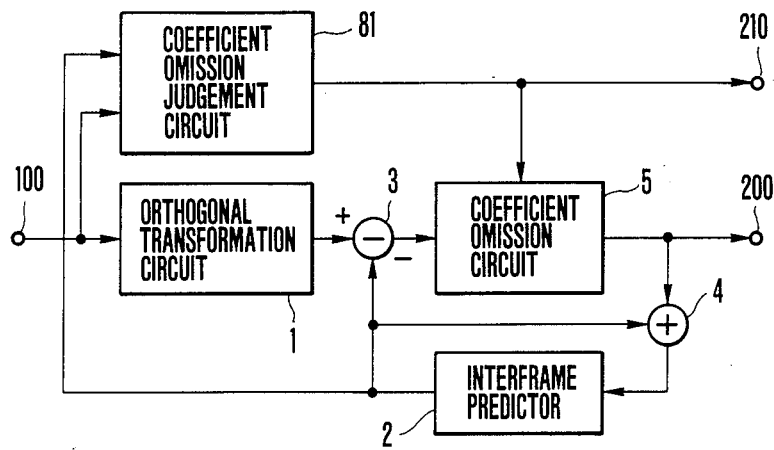
FIGS. 20A, 20B, and 20C are block diagrams of encoders of a fourth type according to still other embodiments of the present invention, respectively.
Figure 20B:
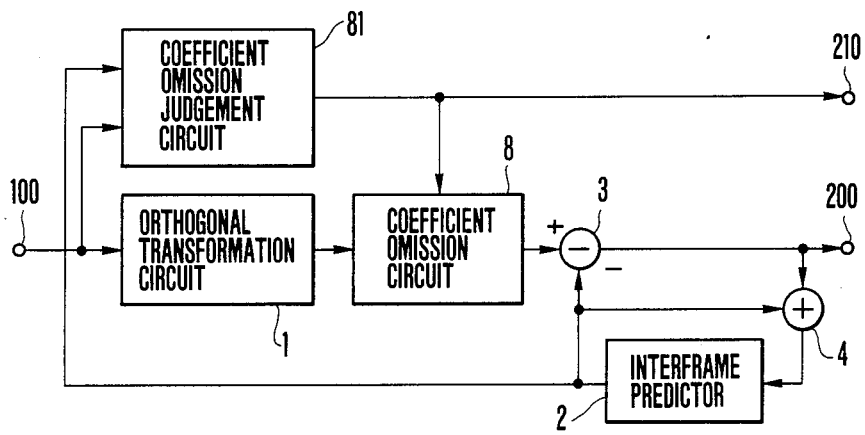
Figure 20C:
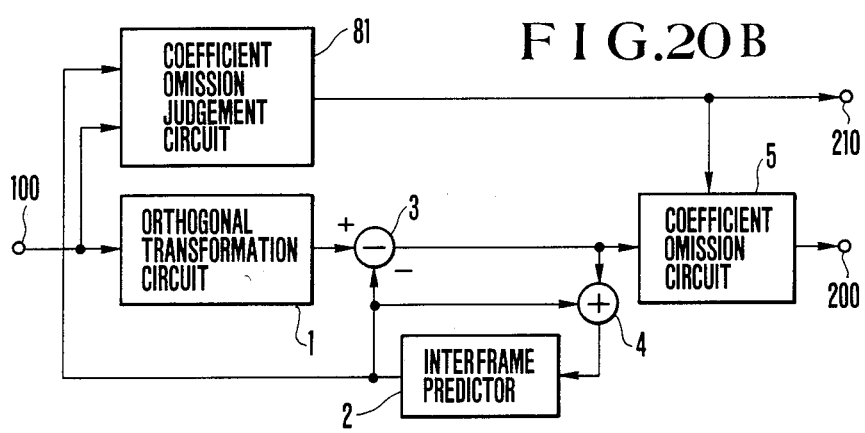

FIGS. 20A, 20B, and 20C are block diagrams of encoders according to other embodiments of the present invention.

In the encoder shown in FIG. 20A, an image signal input from an input terminal 100 is orthogonally transformed by an orthogonal transformation circuit 1 and an output signal from an interframe predictor 2 is subtracted therefrom by a subtracter 3. A coefficient omission judgement circuit 81 generates mode information representing which orthogonal transformation coefficient is to be omitted. The mode information is input to a coefficient omission circuit 5 and output from an output terminal 210. Some coefficients of an output signal from the subtracter 3 are omitted by the coefficient omission circuit 5 on the basis of the mode information output from the coefficient omission judgement circuit 81. An output signal from the coefficient omission circuit 5 appears as a coded image signal at an output terminal 200. An adder 4 adds an output signal from the coefficient omission circuit 5 and the output signal from the interframe predictor 2. The interframe predictor predicts a signal of the next frame from the output signal from the adder 4 and outputs the predicted signal to the subtracter 3 and the coefficient omission judgement circuit 81.

In the encoder in FIG. 20B, an image signal input from an input terminal 100 is orthogonally transformed by an orthogonal transformation circuit 1. A coefficient omission judgement circuit 81 generates mode information representing which coefficient is to be omitted. The mode information is input to a coefficient omission circuit 8 and output to an output terminal 210. Some orthogonal transformation coefficients are omitted by the coefficient omission circuit 8 on the basis of the mode information output by the coefficient omission judgement circuit 81. An output signal from the interframe predictor 2 is subtracted from an output signal from the coefficient omission circuit 8 by a subtracter 3. A difference signal appears as a coded image signal at an output terminal 200. An adder 4 adds an output signal from the subtracter 3 and the output signal from the interframe predictor 2. The interframe predictor 2 predicts a signal of the next frame from the output signal from the adder 4.

In the encoder shown in FIG. 20C, an image signal input from an input terminal 100 is orthogonally transformed by an orthogonal transformation circuit 1 and an output signal from the interframe predictor 2 is subtracted therefrom by a subtracter 3. An output signal from the subtracter 3 is added to the output signal from the interframe predictor 2 by an adder 4. The interframe predictor 2 predicts and outputs a signal of the next frame from the output signal from the adder 4. A coefficient omission judgement circuit 81 generates mode information representing which coefficient is to be omitted. The mode information is input to a coefficient omission circuit 5 and output from an output terminal 210. The coefficient omission circuit 5 omits some coefficients of the output signal from the subtracter 3 on the basis of the mode information output from the coefficient omission judgement circuit 81. An output signal from the coefficient omission circuit 5 appears as a coded image signal from the output terminal.

FIG. 21 shows an encoder/decoder system arranged by combining the decoder of FIG. 14 and an encoder obtained by adding a quantizer 53, a dequantizer 71, and a multiplexer 60 to the encoder of FIG. 20A according to still another embodiment of the present invention.

Interframe predictors 2 and 15 are those shown in FIGS. 11A and 11B, respectively.

As described above, a high resolution is maintained for still blocks, while the orthogonal transformation coefficients are omitted for the motion blocks to decrease resolution. Man's sense of vision has a low resolution for motion blocks. Even if the resolution of the motion block is decreased, image quality cannot be greatly degraded. By omitting the orthogonal transformation coefficients for motion blocks, a motion image signal can be encoded by a small number of data.

Figure 22A:
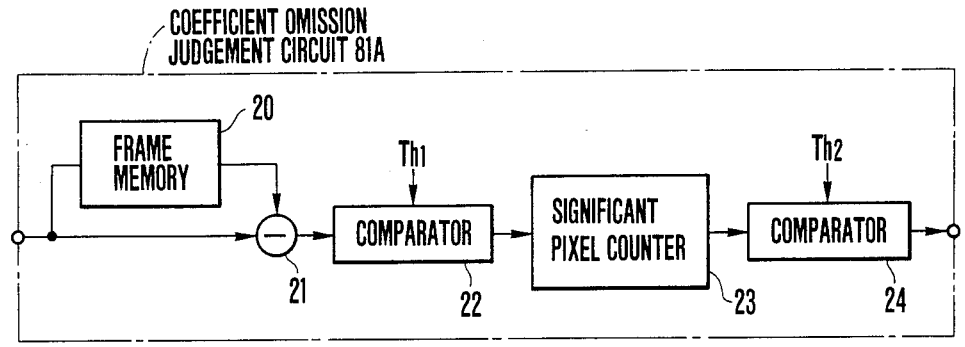
FIGS. 22A and 22B are block diagrams of coefficient omission judgement circuits according to other embodiments of the present invention.
Figure 22B:
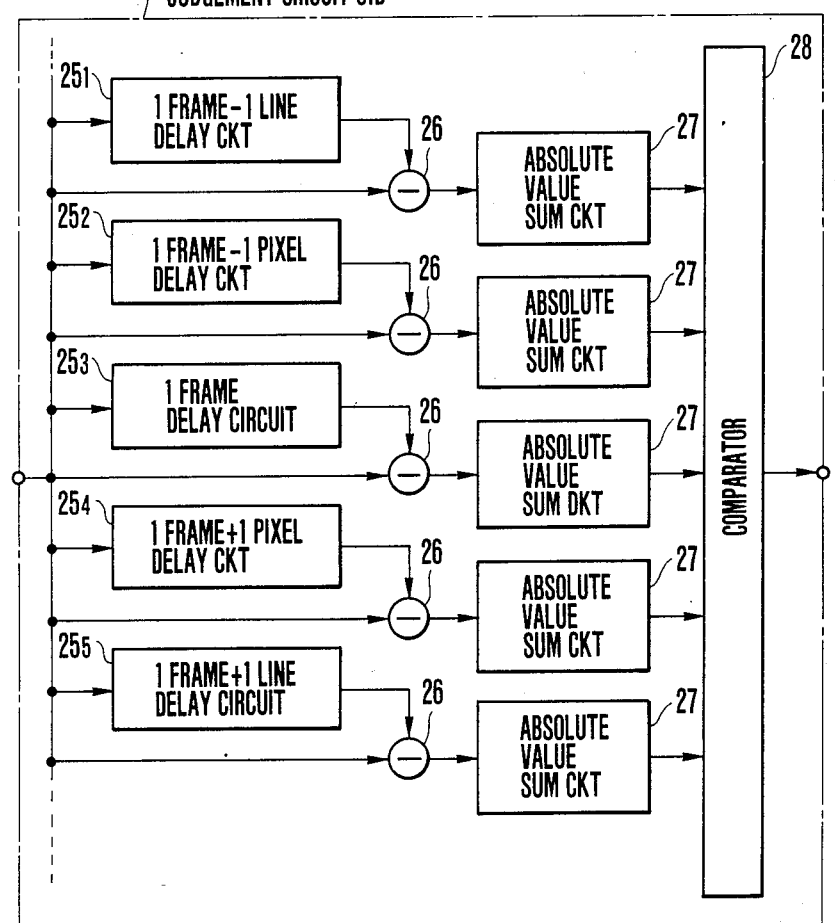

FIGS. 22A and 22B show arrangements of a coefficient omission judgement circuit 81 in the above embodiment.

Figure 23A:
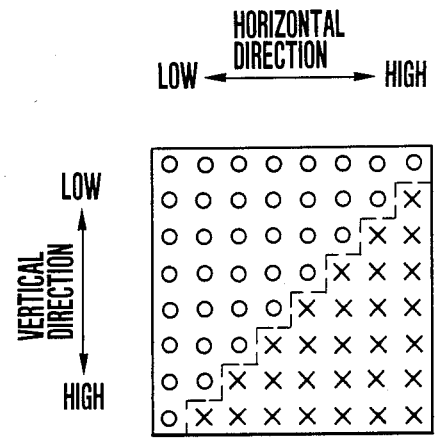
Figure 23B:
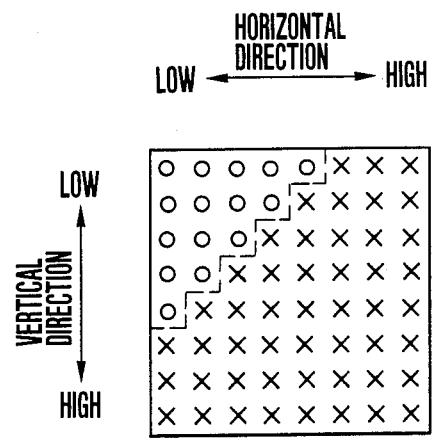

The coefficient omission judgement circuit 81A in FIG. 22A comprises a frame memory 20, a subtracter 21, a comparator 22, a significant pixel counter 23, and a comparator 24. Pixels corresponding to interframe differences of the input image signals larger than a threshold value Th1 in each block are counted. If the number of pixels exceeds a threshold value Th2, the corresponding block is judged as a motion block. Otherwise, the block is judged as a still block. On the basis of the motion information as the judgement result, the coefficient omission circuit 5 reserves the coefficients (indicated by cross marks in FIG. 23A) for the still blocks and omits coefficients (indicated by circles in FIG. 23B) for the motion blocks.

In a coefficient omission judgement circuit 81A in FIG. 22A, a plurality of threshold values Th2 may be used to classify the motion block into a plurality of steps in addition to the discrimination between the motion and still blocks. In this case, the coefficient omission circuit 5 must prepare mask patterns corresponding to the classification steps in the same manner as in FIGS. 23A and 23B.

A coefficient omission judgement circuit 81B in FIG. 22B comprises a plurality of delay circuits $25_1$, $25_2$, ... , a plurality of subtracters 26, a plurality of absolute value circuits 27, and a comparator 28. Several signals which are 1-frame delayed from an input image signal are prepared. The absolute values of the differences between these signals and the signal of the current frame are calculated, and the delay amount is calculated so that the sum of the absolute values is minimized. If the delay amount corresponds to one-frame delay, the corresponding block is a still block. Otherwise, the block is judged as a motion block. In addition, the motion blocks may be classified according to steps deviated from the one-frame delay.

The two coefficient omission judgement circuits 81A and 81B generate mode information representing whether the block is the motion or still block. However, a coefficient omission judgement circuit may be arranged to generate mode information representing which orthogonal transformation coefficient is to be omitted.

What is claimed is:

1. An encoding/decoding method of a motion image signal, wherein, in an encoder, a differenc between an orthogonal transformation coefficient obtained by orthogonally transforming an input image signal of a current frame and a current frame transformation coefficient predicted by the orthogonal transformation coefficient of the previous frame (i.e., the latter coefficient is a predicted orthogonal transformation coefficient in the encoder) is calculated, the difference signal is added to the predicted orthogonal transformation coefficient to locally decode the current frame orthogonal transformation coefficient so that a sum is used to predict an orthogonal transformation coefficient of the next frame, and the difference signal is sent as a coded image signal to a decoder; while the orthogonal transformation coefficient is coded by interframe coding, orthogonal transformation coefficients to be omitted are determined on the basis of the input image signal of the current frame and then omitted, and the resultant information as mode information is sent to the decoder; and wherein, in the decoder, the coded image signal from the encoder is added to the current frame orthogonal transformation coefficient predicted from the decoded orthogonal transformation coefficient of the previous frame, i.e., the predicted orthogonal transformation coefficient in the decoder to decode the orthogonal transformation coefficient of the current frame, and the decoded orthogonal transformation coefficient of the current frame or the predicted orthogonal transformation coefficient in the decoder is transformed according to inverse transformation and the transformed coefficient is output as a decoded image signal; while coefficient omissions are performed for the predicted transformation coefficient on the basis of the mode information from the encoder.

2. A method according to claim 1, wherein, in the encoder, some of the orthogonal transformation coefficients derived from the input image signal or some coefficients of the difference signal between the orthogonal transformation coefficients and the predicted orthogonal transformation coefficients are omitted, and coefficients which are included in the predicted orthogonal transformation coefficients or the locally decoded orthogonal transformation coefficients of the current frame and which are associated with the omitted coefficients are omitted, or some orthogonal transformation coefficients derived from the input image signal are omitted, and coefficients which are included in the interframe difference signal obtained by the interframe prediction of the orthogonal transformation coefficients and which are associated with the omitted coefficients are omitted, and wherein, in the decoder, the current frame orthogonal transformation coefficient predicted from the interframe-decoded previous frame orthogonal transformation coefficient, or the interframe-decoded current frame orthogonal transformation coefficient used for prediction of the orthogonal transformation coefficient of the next frame is subjected to coefficient omissions on the basis of the mode information output from the encoder.

3. A method according to claim 1, wherein the coefficient omissions are performed on the basis of image motion.

4. An encoder for a motion image signal comprising means for orthogonally transforming an input image signal, means for calculating a difference between an orthogonal transformation coefficient obtained by said orthogonal transformation means and an output signal from an interframe predictor, means for omitting some of the orthogonal transformation coefficients of the outputs from said difference calculating means, means for adding an output from said coefficient omitting means and the output signal from said interframe predictor, said interframe predictor for predicting a signal of the next frame from an output signal from said adding means, output means for outputting as a decoded image the output signal generated by said coefficient omitting means, and means for determining which orthogonal transformation coefficients are to be omitted by said coefficient omitting means on the basis of the input image signal, and outputting a result as mode information.

5. An encoder for a motion image signal, comprising means for orthogonally transforming an input image signal and omitting some of orthogonal transformation coefficients, means for calculating a difference between an output signal from said coefficient omitting means and an output signal from an interframe predictor, means for adding an output signal from said difference calculating means and the output signal from said interframe predictor, said interframe predictor for predicting a signal of the next frame on the basis of an output signal from said adding means, means for coding an output signal from said difference calculating means and outputting a result as a coded image signal, and means for determining which orthogonal transformation coefficients are to be omitted by said coefficient omitting means on the basis of the input image signal and outputting a determination result as mode information.

6. An encoder for a motion image signal, comprising means for orthogonally transforming an input image signal, means for calculating a difference between an orthogonal transformation coefficient obtained by said orthogonal transformaion means and an output signal from an interframe predictor, means for adding an output signal from said difference calculating means and the output signal from said interframe predictor, said interframe predictor for predicting a signal of the next frame from an output signal from said adding means, means for omitting some of orthogonal transformation coefficients of the output signals from said difference calculating means, means for outputting as a coded image signal an output signal generated by said coefficient omitting means, and means for determining which orthogonal transformation coefficients are to be omitted by said coefficient omitting means on the basis of the input image signal and for outputting a determination result as mode information.

7. An encoder for a motion image signal, comprising means for orthogonally transforming an input image signal, means for calculating a difference between an orthogonal transformation coefficient obtained by said orthogonal transformation means and an output signal from an interframe predictor, first omitting means for omitting some of orthogonal transformation coefficients of output signals from said difference calculating means, second omitting means for omitting coefficients included in the output signal from said interframe predictor and associated with the orthogonal transformation coefficients omitted by said first coefficient omitting means, means for adding an output signal from said first omitting means and an output signal from said second omitting means, said interframe predictor for predicting a signal of the next frame from an output signal from said adding means, means for outputting as a coded image signal the output signal generated by said first omitting means, and means for generating mode information for designating which coefficients are omitted by said first and second omitting means.

8. An encoder for a motion image signal, comprising means for orthogonally transforming an input image signal, means for calculating a difference between an orthogonal transformation coefficient obtained by said orthogonal transformation means and an output signal from an interframe predictor, means for omitting some of orthogonal transformation coefficients from output signals from said difference calculating means, means for adding an output signal from said omitting means and the output signal from said interframe predictor, said interframe predictor for omitting coefficients included in an output signal from said adding means and associated with the orthogonal transformation coefficients omitted by said omitting means and predicting a signal of the next frame on the basis of the resultant signal, or for predicting the signal of the next frame on the basis of the output signal from said adding means, omitting, orthogonal transformation coefficients associated with the coefficients omitted by said omitting means, from the predicted signal of the next frame, and outputting the resultant signal, means for outputting as a coded image signal the output signal generated by said omitting means, and means for generating mode information representing which coefficients are to be omitted by said omitting means.

9. An encoder for a motion image signal, comprising means for orthogonally transforming an input image signal, means for omitting some of orthogonal transformation coefficients obtained by said orthogonal transformation means, means for calculating a difference between an output signal from said omitting means and an output signal from an interframe predictor, means for adding an output signal from said difference calculating means and the output signal from said interframe predictor, the interframe predictor for omitting coefficients included in an output signal from said adding means and associated with the orthogonal transformation coefficients omitted by said omitting means and predicting a signal of the next frame on the basis of the resultant signal, or for predicting the signal of the next frame on the basis of the output signal from said adding means, omitting, orthogonal transformation coefficients associated with the coefficients omitted by said omitting means, from the predicted signal of the next frame, and outputting the resultant signal, means for outputting as a coded image signal an output signal generated by the difference calculating means, and means for generating mode information representing which coefficients are to be omitted by said omitting means.

10. An encoder for a motion image signal, comprising means for orthogonally transforming an input image signal, means for calculating a difference between an orthogonal transformation coefficient obtained by said orthogonal transformation means and an output signal from an interframe predictor, means for omitting some of the coefficients from an output signal from said difference calculating means, means for adding the output signal from said difference calculating means and the output signal from said interframe predictor, said interframe predictor for omitting coefficients included in the output signal from said adding means and associated with the orthogonal transformation coefficients omitted by said omitting means and predicting a signal from the next frame on the basis of the resultant signal, or for predicting the signal of the next frame on the basis of the output signal from said adding means, omitting, orthogonal transformation coefficients associated with the coefficients omitted by said omitting means, from the predicted signal of the next frame, and outputting the resultant signal, means for outputting as a coded image signal an output signal generated by said omitting means, and means for generating mode information representing which coefficients are to be omitted by said omitting means.

11. An encoder for a motion image signal, comprising means for orthogonally transforming an input image signal, means for omitting some of orthogonal transformation coefficients obtained by said orthogonal transformation means, means for calculating a difference between an output signal from said omitting means and an output signal from an interframe predictor, means for omitting coefficients included in an output signal from said difference calculating means and associated with the orthogonal transformation coefficients omitted by said omitting means, means for adding an output signal from said difference calculating means and the output signal from said interframe predictor, said interframe predictor for predicting a signal of the next frame from the output signal from said adding means, means for outputting as a coded image signal an output signal generated by said omitting means, and means for generating mode information representing which coefficients are omitted by said omitting means.

12. A decoder for a motion image signal, comprising means for adding an output signal from an interframe predictor to a coded image signal output from an encoder, means for omitting some of orthogonal transformation coefficients of an output signal from said adding means on the basis of mode information output from the encoder, said interframe predictor for predicting a signal of the next frame from an output signal from said omitting means, means for performing an inverse orthogonal transformation of the output signal from said interframe predictor or said omitting means, and means for outputting as a decoded image signal an output signal generated by said inverse orthogonal transforming means.

13. A decoder for a motion image signal, comprising means for adding a coded image signal output from an encoder and an output signal from an interframe predictor, said interframe predictor for predicting a signal of the next frame from an output signal from said adding means, omitting coefficients from the signal of the next frame on the basis of mode information output from the encoder and outputting the resultant signal, or for omitting the coefficients from an output signal from said adding means on the basis of the mode information output from the encoder and predicting the signal of the next frame on the basis of the resultant signal, means for performing an inverse orthogonal transformation of the output signal from said interframe predictor or said omitting means, and means for outputting as a decoded image signal an output signal generated by said inverse orthogonal transforming means.

14. An encoder for a motion image signal, comprising means for orthogonally transforming an input image signal, means for calculating a difference between an orthogonal transformation coefficient obtained by said orthogonal transformation means and an output signal from an interframe predictor, means for adding an output signal from the difference calculating means and the output signal from said interframe predictor, said interframe predictor for omitting some of the coefficients of the output signal from said adding means and predicting a signal of the next frame, or for predicting the signal of the next frame from the output signal from said adding means and omitting some of the coefficients of the signal of the next frame, means for outputting as a coded image signal an output signal generated by said difference calculating means, and means for generating mode information representing which coefficients are omitted by said interframe predictor.

15. An encoder comprising means for orthogonally transforming an input image signal, coefficient omission judging means for judging which orthogonal transformation coefficient is to be interframe-coded and which orthogonal transformation coefficient is to be omitted, and for outputting a judgement result as mode information, and output means for receiving an output from said orthogonal transforming means, omitting and interframe-coding the orthogonal transformation coefficients in accordance with the mode information output from said coefficient omission judging means, and for outputting an operation result as a coded image signal.

16. An encoder according to claim 15, wherein said coefficient omission judging means comprises means for calculating an interframe difference of the input image signal in units of blocks, and means for counting pixels when the interframe difference exceeds a first predetermined threshold value, said coefficient omission judging means being adapted to judge a given block as a motion block if an output from said counting means in correspondence of the given block exceeds a second predetermined threshold value and as a still block when the count is smaller than the second predetermined threshold value.

17. An encoder according to claim 15, wherein said coefficient omission judging means comprises a plurality of delay circuits for giving delay times to the input image signal in units of frames, a plurality of subtracters for calculating differences between outputs from said plurality of delay circuits and the input image signal, a circuit for calculating a sum of absolute values of outputs from said plurality of subtracters, and a comparator for calculating a minium one of outputs from said absolute value sum calculating circuit.

18. An encoder according to claim 17, wherein the delay times of said plurality of delay circuits are a value obtained by adding an integer multiple of one line to or subtracting the integer multiple of one line from one frame, and a value obtained by adding an integer number of pixels to or subtracting the integer number of pixels from one frame.

* * * * *